US012659858B2

(12) United States Patent
Peng et al.

(10) Patent No.: US 12,659,858 B2
(45) Date of Patent: Jun. 16, 2026

(54) PAGING INDICATION INFORMATION GROUPING TECHNIQUES

(71) Applicant: ZTE Corporation, Guangdong (CN)

(72) Inventors: Focai Peng, Shenzhen (CN); Mengzhu Chen, Shenzhen (CN); Jun Xu, Shenzhen (CN); Xuan Ma, Shenzhen (CN); Ningbo Bai, Shenzhen (CN); Ting Miao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 358 days.

(21) Appl. No.: 18/220,023

(22) Filed: Jul. 10, 2023

(65) Prior Publication Data

US 2023/0354190 A1    Nov. 2, 2023

Related U.S. Application Data

(63) Continuation of application No. PCT/CN2021/082978, filed on Mar. 25, 2021.

(51) Int. Cl.
*H04W 52/02* (2009.01)
*H04W 68/02* (2009.01)

(52) U.S. Cl.
CPC ... *H04W 52/0216* (2013.01); *H04W 52/0229* (2013.01); *H04W 52/028* (2013.01); *H04W 68/025* (2013.01)

(58) Field of Classification Search
CPC ......... H04W 52/0216; H04W 52/0229; H04W 52/028; H04W 68/025; H04W 76/27; Y02D 30/70
See application file for complete search history.

(56) References Cited

U.S. PATENT DOCUMENTS

| | | | |
|---|---|---|---|
| 2021/0014827 A1 | 1/2021 | Rune et al. | |
| 2023/0032154 A1* | 2/2023 | Hwang | H04L 5/0053 |
| 2023/0063026 A1* | 3/2023 | Reial | H04W 52/0235 |
| 2023/0108646 A1* | 4/2023 | Tseng | H04W 68/025 |
| | | | 455/458 |
| 2023/0284182 A1* | 9/2023 | Shi | H04W 72/232 |
| | | | 370/329 |
| 2023/0397115 A1* | 12/2023 | Maleki | H04W 52/0235 |
| 2023/0397159 A1* | 12/2023 | Li | H04W 52/0216 |

(Continued)

FOREIGN PATENT DOCUMENTS

| | | |
|---|---|---|
| CN | 111278090 A | 6/2020 |
| WO | WO-2018/201482 A1 | 11/2018 |

OTHER PUBLICATIONS

3GPP TSG RAN WG1 #104-e; R1-2100392; Source: CATT; Title: Paging enhancement for UE power saving; e-Meeting, Jan. 25-Feb. 5, 2021 (Year: 2021).*

(Continued)

*Primary Examiner* — Mohammed S Chowdhury
(74) *Attorney, Agent, or Firm* — Foley & Lardner LLP

(57) ABSTRACT

Techniques are described to perform paging related operation or power saving related operation. An example wireless communication method includes receiving, by a communication device in a low power radio resource control (RRC) state, a first signal that includes a first set of parameters, and performing, by the communication device, a paging related operation based at least on the first set of parameters or a power saving related operation based at least on the first set of parameters.

16 Claims, 9 Drawing Sheets

(56)  References Cited

U.S. PATENT DOCUMENTS

| 2024/0039669 A1* | 2/2024 | Koskela | H04L 5/0051 |
| 2024/0163846 A1* | 5/2024 | Sheng | H04W 68/025 |

OTHER PUBLICATIONS

3GPP TSG RAN WG1 #104-e; R1-2100393; Source: CATT; Title: Configuration of TRS/CSI-RS for paging enhancement; e-Meeting, Jan. 25-Feb. 5, 2021 (Year: 2021).*

3GPP TSG RAN WG1 Meeting #104-e; R1-2100998; Source: Lenovo, Motorola Mobility; Title: Paging enhancement for UE power saving; e-Meeting, Jan. 25-Feb. 5, 2021 (Year: 2021).*

3GPP TSG RAN WG1 #104-e; R1-2101622; Source: NTT DOCOMO, Inc.; Title: Discussion on paging enhancements; e-Meeting, Jan. 25-Feb. 5, 2021 (Year: 2021).*

3GPP TSG RAN WG1 #104e; R1-2101664; Source: Nokia, Nokia Shanghai Bell; Title: Evaluation of potential paging enhancements; e-Meeting, Jan. 25-Feb. 5, 2021 (Year: 2021).*

3GPP TSG RAN WG1 Meeting #104-e; R1-2101300; Source: Panasonic; Title: On Paging Enhancement; e-Meeting, Jan. 25-Feb. 5, 2021 (Year: 2021).*

Ericsson, "Indication of CN initiated or RAN initiated paging", 3GPP TSG-RAN WG2 #101, Tdoc R2-1802341, Athens, Greece, Mar. 2, 2018 (4 pages).

International Search Report and Written Opinion on PCT Appl No. PCT/CN2021/082978, mailed Dec. 2, 2021 (8 pages).

LG Electronics Inc., "Ue subgrouping for paging enhancement", 3GPP TSG-RAN WG2 Meeting #113-e, R2-2100993, E-Meeting, Feb. 5, 2021 (3 pages).

ZTE, "Discussion on power saving enhancements for paging", 3GPP TSG RAN WG1 #103-e, R1-2007971, E-Meeting, Nov. 13, 2020 (8 pages).

* cited by examiner

500

502

Receiving, by a communication device in a low power radio resource control (RRC) state, a first signal that includes a first set of parameters

504

Performing, by the communication device, a paging related operation based at least on the first set of parameters or a power saving related operation based at least on the first set of parameters

700

702

Receiving, by a communication device in a low power radio resource control (RRC) state, a first signal that includes a first set of parameters

704

Performing, by the communication device, a pre-defined operation based at least on the first set of parameters

PAGING INDICATION INFORMATION GROUPING TECHNIQUES

CROSS-REFERENCE TO RELATED APPLICATION

This application claims the benefit of priority under 35 U.S.C. § 120 as a continuation of International Patent Application No. PCT/CN2021/082978, filed on Mar. 25, 2021, the disclosure of which is incorporated herein by reference in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for grouping paging indication information. An example wireless communication method includes receiving, by a communication device in a low power radio resource control (RRC) state, a first signal that includes a first set of parameters; and performing, by the communication device, a paging related operation based at least on the first set of parameters or a power saving related operation based at least on the first set of parameters.

In some embodiments, the method further includes receiving, by the communication device in the low power RRC state before the performing, a second signal that includes a second set of parameters, the paging related operation is based on the first set of parameters and the second set of parameters, and the power saving related operation is based on the first set of parameters and the second set of parameters. In some embodiments, the first set of parameters or the second set of parameters includes any one or more of following listed parameters: a group identifier of a group to which the communication device or another communication device belongs, a device identifier of the communication device or the another communication device, a 5G S-Temporary Mobile Subscriber Identifier (5G-S-TMSI) of the communication device or the another communication device, a category to which the communication device or the another communication device belongs, a radio resource control (RRC) state, a paging probability threshold value, a power saving level, a power efficiency level, a tracking reference signal (TRS) indication information, and a channel state information reference signal (CSI-RS) indication information.

In some embodiments, the first set of parameters includes at least a first parameter that includes a subset of information of one parameter from the listed parameters, and the second set of parameters includes at least a second parameter that includes a remaining subset of information of the one parameter from the listed parameters, and a complete information of the one parameter comprises the subset of information and the remaining subset of information. In some embodiments, N parameters indicate a total number of the listed parameters, the first set of parameters includes N1 parameters from the listed parameters, the second set of parameters includes N2 parameters from the listed parameters, N, N1, and N2 are integers, N is greater than or equal to 2, and N is equal to N1+N2. In some embodiments, the first set of parameters include a same set of parameters as the second set of parameters. In some embodiments, the first set of parameters are different from the second set of parameters. In some embodiments, the first set of parameters includes the group identifier and the second set of parameters include the device identifier.

In some embodiments, the first set of parameters includes an entire information associated with or a part of the entire information associated with any one or more of: the group identifier, the category to which the communication device or the another communication device belongs, the power saving level, the power efficiency level, the RRC state, and the paging probability threshold value. In some embodiments, the first set of parameters or a first part of at least one parameter from the first set of parameters is included in a resource allocation information of the first signal, a sequence generation information of the first signal, a radio network temporary identifier (RNTI) of the first signal, or a scrambling identifier of the first signal. In some embodiments, the first set of parameters or a second part of the at least one parameter from first set of parameters is indicated by a codepoint or an information field of the first signal, and the second part of the first set of parameters is different than the first part of the first set of parameters. In some embodiments, the first set of parameters includes a least significant bit (LSB) of the device identifier, and the second set of parameters includes a most significant bit (MSB) of the device identifier. In some embodiments, the first signal includes a wake-up signal (WUS). In some embodiments, the second signal is received on a paging scheduling channel.

In some embodiments, the communication device receives the WUS that includes a part of the group identifier, the communication device receiving the second signal includes the communication node receiving a paging scheduling channel that includes a second part of the group identifier, and a complete information of the group identifier is included in the first part and the second part. In some embodiments, the communication device receives the WUS that includes a part of the device identifier, the communication device receiving the second signal includes the communication node receiving a paging scheduling channel that includes a second part of the device identifier, and a complete information of the device identifier is included in the first part and the second part. In some embodiments, the group identifier or the device identifier is indicated by the first signal or the second signal. In some embodiments, the group identifier is based on a part of information or an entire information associated with: the device identifier of the communication device, the 5G-S-TMSI, the category to which the communication device or the another communication device belongs, the RRC state, or the paging probability threshold value. In some embodiments, the paging scheduling channel includes a paging physical downlink control channel (PDCCH).

In some embodiments, one or more of most significant bits (MSBs) of the device identifier is included in the WUS. In some embodiments, one or more of least significant bits (LSBs) of the device identifier is included in the WUS. In some embodiments, one or more parameters to be included in the first set of parameters in the WUS is pre-determined. In some embodiments, one or more parameters to be included in the second set of parameters in the paging scheduling channel is pre-determined. In some embodiments, a system information block (SIB) received by the communication device indicates: (1) one or more parameters that are included in the first set of parameters in the WUS, or (2) one or more parameters that are included in the second set of parameters in the paging scheduling channel. In some embodiments, the performing the paging related operation includes: entering an active state from the low power RRC state; and monitoring, in the active state, a paging occasion to receive a paging message in the paging occasion. In some embodiments, the monitoring the paging occasion includes determining an absence of the paging message in the paging occasion.

In some embodiments, the performing the power saving related operation includes: determining not to monitor a paging occasion while remaining in the low power RRC state. In some embodiments, the first set of parameters include a subset of a plurality of parameters from the second set of parameters. In some embodiments, the low power RRC state includes an RRC idle state or an RRC inactive state.

Another example wireless communication method, comprises transmitting, by a network node, a first signal that includes a first set of parameters; transmitting, by the network node, a second signal that includes a second set of parameters; and transmitting a paging message using information in the first set of parameters and the second set of parameters.

In some embodiments, the first set of parameters or the second set of parameters includes any one or more of following listed parameters: a group identifier of a group to which a communication device belongs, a device identifier of the communication device, a 5G S-Temporary Mobile Subscriber Identifier (5G-S-TMSI) of the communication device, a category to which the communication device belongs, a power saving level, a power efficiency level, a radio resource control (RRC) state, a paging probability threshold value, a tracking reference signal (TRS) indication information, and a channel state information reference signal (CSI-RS) indication information. In some embodiments, the first set of parameters includes at least a first parameter that includes a subset of information of one parameter from the listed parameters, and the second set of parameters includes at least a second parameter that includes a remaining subset of information of the one parameter from the listed parameters, and a complete information of the one parameter comprises the subset of information and the remaining subset of information. In some embodiments, N parameters indicate a total number of the listed parameters, the first set of parameters includes N1 parameters from the listed parameters, the second set of parameters includes N2 parameters from the listed parameters, N, N1, and N2 are integers, N is greater than or equal to 2, and N is equal to N1+N2.

In some embodiments, the first set of parameters include a same set of parameters as the second set of parameters. In some embodiments, the first set of parameters are different from the second set of parameters. In some embodiments, the first set of parameters includes the group identifier and the second set of parameters include a device identifier. In some embodiments, the first set of parameters includes a least significant bit (LSB) of the device identifier, and the second set of parameters includes a most significant bit (MSB) of the device identifier. In some embodiments, the first signal includes a wake-up signal (WUS). In some embodiments, the second signal is received on a paging scheduling channel. In some embodiments, one or more parameters to be included in the first set of parameters in the WUS is pre-determined. In some embodiments, one or more parameters to be included in the second set of parameters in the paging scheduling channel is pre-determined. In some embodiments, a system information block (SIB) transmitted by the network node indicates: (1) one or more parameters that are included in the first set of parameters in the WUS, and (2) one or more parameters that are included in the second set of parameters in the paging scheduling channel.

Yet another example wireless communication method comprises receiving, by a communication device in a low power radio resource control (RRC) state, a first signal that includes a first set of parameters; and performing, by the communication device, a pre-defined operation based at least on the first set of parameters.

In some embodiments, the performing the pre-defined operation includes: receiving, by the communication device in the low power RRC state, a second signal that includes a second set of parameters. In some embodiments, the performing the pre-defined operation includes: entering an active state from the low power RRC state; and monitoring, in the active state, a paging occasion to receive a paging message in the paging occasion. In some embodiments, the monitoring the paging occasion includes determining an absence of the paging message in the paging occasion. In some embodiments, the performing the pre-defined operation includes: determining not to monitor a paging occasion while remaining in the low power RRC state. In some embodiments, the first set of parameters or the second set of parameters includes any one or more of following listed parameters: a group identifier of a group to which the communication device or another communication device belongs, a device identifier of the communication device or the another communication device, a 5G S-Temporary Mobile Subscriber Identifier (5G-S-TMSI) of the communication device or the another communication device, a category to which the communication device or the another communication device belongs, a power saving level, a power efficiency level, a radio resource control (RRC) state, a paging probability threshold value, a tracking reference signal (TRS) indication information, and a channel state information reference signal (CSI-RS) indication information.

In some embodiments, the first set of parameters includes at least a first parameter that includes a subset of information of one parameter from the listed parameters, the second set of parameters includes at least a second parameter that includes a remaining subset of information of the one parameter from the listed parameters, and a complete information of the one parameter comprises the subset of information and the remaining subset of information. In some embodiments, the first set of parameters includes a least significant bit (LSB) of the device identifier. In some embodiments, one or more parameters to be included in the first set of parameters is pre-determined. In some embodiments, one or more parameters to be included in the second set of parameters is pre-determined. In some embodiments, the low power RRC state includes an RRC idle state or an RRC inactive state.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 5 shows a flowchart of an example method for performing a paging related operation or a power saving related operation.

FIG. 6 shows a flowchart for an example method of transmitting a paging message.

FIG. 7 shows a flowchart for an example method for a communication device to perform a predefined operation.

DETAILED DESCRIPTION

In the 5$^{th}$ Generation mobile communication system (5G), the Discontinuous Reception (DRX) is technology that does not require UE contiguously receive signal/channel from base station. It can intermittently receive signal/channel for a period of time while stop doing that in another period of time. The period of a DRX is referred to as a DRX cycle. One DRX cycle includes ON duration of a DRX cycle (DRX-ON) and OFF duration of a DRX cycle (DRX-OFF). For a UE under radio resource control connected (RRC_Connected) state, this UE will apply DRX for connected mode (C-DRX). For a UE under RRC_Idle/RRC_Inactive state, this UE will apply DRX for idle mode (I-DRX).

For a UE under RRC_Idle/RRC_Inactive state, this UE should detect possible paging during PO of each paging cycle during DRX-ON duration. In some time, there will be no PDCCH that schedules paging message. In another some time, there will be PDCCH but there is no PDSCH that carries paging message. In still another some time, there will be both PDCCH and PDSCH but the PDSCH does not include content in the paging message for this UE. Under these circumstances, there should be some method to reduce UE's power consumption.

During one Paging Occasion (PO) of a paging cycle, one User Equipment (UE) which is under Radio Resources Control (RRC) Idle state (RRC_Idle) or RRC inactive state (RRC_Inactive) might have no Physical Downlink Control Channel (PDCCH) which schedules paging message. This UE might also have no Physical Downlink Shared Channel (PDSCH) that carries paging message. Even so, this UE has to receive and decode PDCCH/PDSCH during a paging cycle. This operation will consume some unnecessary power. During one PO, this UE might have PDCCH (because the network might schedule multiple paging messages together) but the content of corresponding PDSCH does not include an actual paging message for this UE. This operation will also consume some unnecessary power.

The techniques described in this patent document can, among other benefits, enable a UE to know more precisely whether there is paging message for the UE or not. As the result, the UE can reduce unnecessary paging. Thus, one of the technical benefits of the technology described in this patent document is that it can save UE's power consumption.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Introduction

Figure 1:
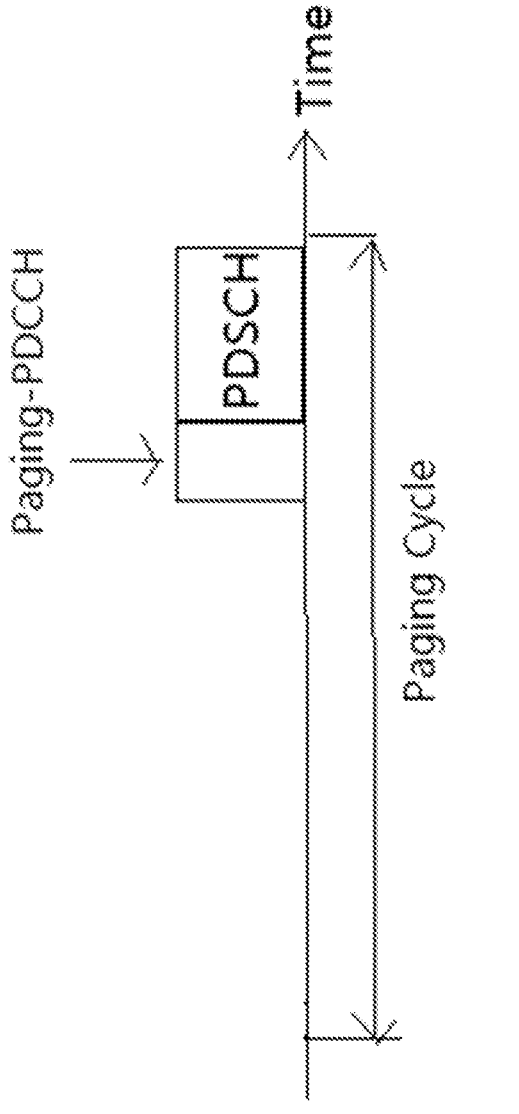
FIG. 1 is example timing diagram of a paging cycle that includes a paging physical downlink control channel (PDCCH) and a physical downlink shared channel (PDSCH) that includes a paging message.

In current New Radio access technology (NR; New RAT) system (Rel-15/Rel-16), a User equipment (UE) under radio resource control-idle/inactive (RRC_Idle/RRC_Inactive) state will receive paging message in every paging cycle as shown in FIG. 1. The paging message is carried on physical downlink shared channel (PDSCH) which is scheduled by the corresponding physical downlink control channel (PDCCH; also known as paging PDCCH as shown in FIG. 1). A UE monitors a paging occasion by receiving the paging PDCCH (or paging scheduling channel) and the possible paging message on the PDSCH. The UE may receive a possible paging message at least because, in some embodiments, the UE may not receive the paging message even if the UE receives the paging PDCCH. In some cases, however, the paging message might not be for the UE that receive the paging PDCCH. That is, the paging message does not contain the 5$^{th}$ Generation System Temporary Mobile Subscription Identifier (5G-S-TMSI) of this UE. For this case, a false alarm occurs at least because the UE receives the paging PDCCH that indicates that a paging message is incoming on the PDSCH but the UE identifier in the paging message is not the device identifier of the UE that received the paging message. This false alarm will waste energy of this UE. If the false alarm can be avoided, then the UE can save power consumption.

Figure 2:
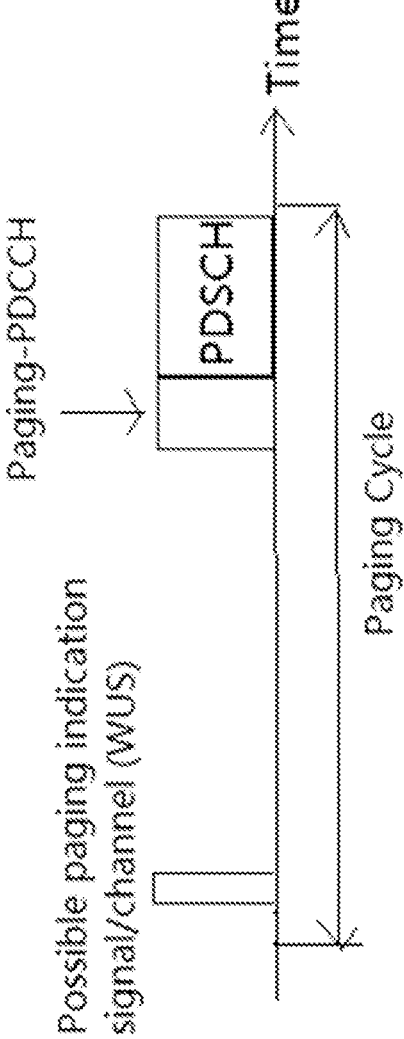
FIG. 2 shows an example timing diagram of a paging cycle that includes a paging indication signal or channel, a paging PDCCH, and a PDSCH.

As shown in FIG. 2, before UE receives a paging message, if a paging indication (or paging indication information) can inform the UE that this UE can skip this reception of paging message (and/or skip reception of the paging PDCCH), then the false alarm can be reduced. The paging indication information can be carried on paging indication signal/channel (e.g., wake-up signal/channel, WUS) and/or paging scheduling channel (e.g., Paging-PDCCH).

Example Techniques #1—Group Identifier

In current New Radio access technology (NR; New RAT) system (Rel-15/Rel-16), a User equipment (UE) under radio resource control-idle/inactive (RRC_Idle/RRC_Inactive) state will receive paging message in every paging cycle. The paging message is carried on physical downlink shared channel (PDSCH) which is scheduled by the corresponding physical downlink control channel (PDCCH; paging PDCCH). However, the paging message might not be for this UE. That is, the paging message does not contain the $5^{th}$ Generation System Temporary Mobile Subscription Identifier (5G-S-TMSI) of this UE. For this case, a false alarm occurs. This false alarm will waste energy of this UE. If the false alarm can be avoided, then the UE can save power consumption.

Before UE receives a paging message, if a paging indication can inform the UE that this UE can skip this reception of paging message (and/or skip reception of the paging PDCCH), then the false alarm can be reduced.

The paging indication can be carried on one, two or more entities (e.g., signal/channel). In some embodiments, the paging indication can be carried on existing paging PDCCH or a kind (or type) of signal/channel or both. For the case of that the paging indication is carried on existing paging PDCCH and a kind of signal/channel, the large scale information can be carried on a kind of signal/channel while a small scale information can be carried on existing paging PDCCH. Large scale information may include information of a lot of UEs, whereas small scale information may include information relatively fewer UEs.

Figure 3:
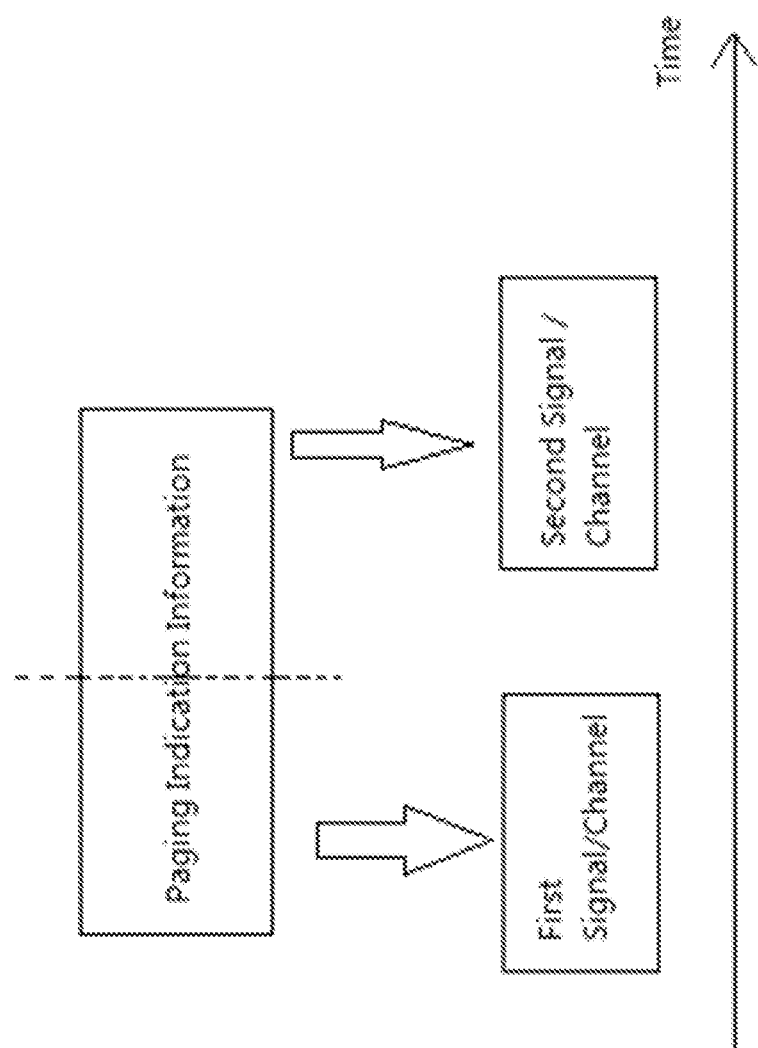
FIG. 3 shows an example of a splitting of paging indication information to send parts of the paging indication information to the communication device via the first signal or channel and a second signal or channel.

It should be noted that, the "existing paging PDCCH" here may have the same format of paging PDCCH for Rel-15/Rel-16 UE but its content (or bits) might be with re-interpretation. For example, three reserved bits in existing paging PDCCH can be re-interpreted as last three bits of UE ID. In some embodiments, the whole paging indication information can be divided into two or more parts. Each part can be carried on the same or different entity (e.g., on signal or channel). FIG. 3 shows an example of a splitting of paging indication information to send a part of the paging indication information to a communication device via a first signal channel and a remaining (or another) part of the paging indication information to the communication device via a second signal or channel. For example, as shown in FIG. 3, if the whole paging indication information has two bits, then the first kind of signal/channel can carry the first bit of the paging indication information while the second kind of signal/channel can carry the second bit of the paging indication information. The advantage of this method is that some UE will go to sleep (or keep sleep) after receiving the first/second part of paging indication information. Hence, these UEs can save power consumption.

For example, if there were 8 groups, then the group ID will be 0, 1, 2, 3, 4, 5, 6, 7 where the binary format of the group ID will be 000, 001, 010, 011, 100, 101, 110, 111. For this case, the most significant bit (MSB) of the group ID will be carried on a kind of signal/channel while the last two least significant bit (LSB) of the group ID will be carried on existing paging PDCCH. For example, if three groups of UE will be paged with group ID 0, 2 and 3, then the MSB (e.g., bit "0") will be carried on a kind of signal/channel while the two LSB (e.g., "00", "10", "11") are carried on existing paging PDCCH.

At the UE side, after receiving the new signal/channel (e.g., the first kind of signal/channel), the UE groups with group ID 0, 1, 2, 3 will continue to receive paging PDCCH while the UE groups with group ID 4, 5, 6, 7 will continue to sleep (or will go to sleep). The long sleep will reduce power consumption of UE.

Next, after decoding paging PDCCH, the UE groups with group ID 0, 2, 3 will continue to receive paging message (on PDSCH) while the UE groups with group ID 1 will go to sleep. The sleep will reduce power consumption of UE.

In addition, the group ID can be deduced from UE ID or 5G-S-TMSI where the UE ID is the last 10 bits of 5G-S-TMSI. For example, the group ID is the last 3 bits of UE ID (e.g., the last 3 bits of 5G-S-TMSI). For another example, the group ID is the first 3 bits of UE ID (e.g., the last $8^{th}$ to $10^{th}$ bits of 5G-S-TMSI). For still another example, the group ID is the last $11^{th}$ to $13^{th}$ bits of 5G-S-TMSI. For still another example, the group ID is the last $13^{th}$ to $11^{th}$ bits of 5G-S-TMSI.

In some embodiments, one bit on new signal/channel will indicate which group should take action on ongoing paging occasion(s) (PO; including paging-PDCCH, paging-PDSCH) while the existing paging PDCCH indicates the detailed operation (e.g., which UE group should receive paging-PDSCH, which UE group should go to sleep).

In some embodiments, a UE will monitor one or more signal/channels to monitor paging indication. In some embodiments, a UE under RRC_Idle/RRC_Inactive state will monitor one or more signal/channels to monitor paging indication. In some embodiments, a UE under RRC_Idle/RRC_Inactive state will monitor one kind of paging indication from one kind of signal/channel while the UE will monitor another kind of paging indication from another kind of signal/channel. Furthermore, a UE under RRC_Idle/RRC_Inactive state will monitor one kind of paging indication from one kind of signal/channel (e.g., a WUS in form of sequence/signal) and, the UE will monitor another kind of paging indication from another kind of signal/channel (e.g., another WUS in form of channel) and, the UE will monitor still another kind of paging indication from still another kind of signal/channel (e.g., paging-PDCCH). All of these three kinds of paging indication are a sub-set of the overall paging indication. For example, the first kind of paging indication is UE category (e.g., enhanced mobile broadband UE, eMBB UE, reduced capability UE, RedCap UE) and, the second kind of paging indication is UE group ID and the third kind of paging indication is UE ID. For another example, the first, second, third kind of paging indication is a sub-set of UE ID (e.g., the first, second, third bit of the last three bits of UE ID). In some embodiments, the first kind of paging indication is UE category (e.g., eMBB UE, RedCap UE) carried on one kind of signal/channel (e.g., a WUS) and the second kind of paging indication is UE ID carried on another kind of signal/channel (e.g., paging-PDCCH).

In some embodiments, a UE will receive one or more signal/channels to receive (or monitor) paging indication. In some embodiments, a UE under RRC_Idle/RRC_Inactive state will receive one or more signal/channels to receive paging indication. In some embodiments, a UE under RRC_Idle/RRC_Inactive state will receive one kind of paging indication from one kind of signal/channel while the UE will receive another kind of paging indication from another kind of signal/channel. Furthermore, a UE under RRC_Idle/RRC_Inactive state will receive one kind of paging indication from one kind of signal/channel (e.g., a WUS in form of sequence/signal) and, the UE will receive another kind of paging indication from another kind of signal/channel (e.g., another WUS in form of channel) and, the UE will receive still another kind of paging indication from still another kind of signal/channel (e.g., paging-PDCCH).

In some embodiments, a UE under RRC_Idle/RRC_Inactive state will monitor one kind of paging indication signal/channel for one kind of paging indication while the UE will monitor another kind of paging indication signal/channel for another kind of paging indication. For example, a UE under RRC_Idle/RRC_Inactive state will monitor paging indication signal/channel (e.g., wake up signal, WUS) for MSB of UE group ID while the UE will monitor existing paging-PDCCH for LSB of UE group ID.

In some embodiments, a UE under RRC_Idle/RRC_Inactive state will monitor one kind of paging indication signal/channel for one kind of paging indication and, the UE will monitor another kind of paging indication signal/channel for another kind of paging indication and, the UE will monitor still another kind of paging indication signal/channel for still another kind of paging indication. For example, a UE under RRC_Idle/RRC_Inactive state will monitor paging indication signal/channel (e.g., wake up signal, WUS) for MSB of UE group ID and, the UE will monitor another WUS for a second MSB of UE group ID and, the UE will monitor existing paging-PDCCH for LSB of UE group ID. After receiving more kind of signal/channel, the scope of UE will be reduced. Hence, the UE that is not related to the paging indication information will go to sleep (or keep sleep) for power saving.

In some embodiments, a part of the paging indication information (e.g., grouping indication information) is carried on a first kind of paging indication signal/channel (e.g., implicitly on the resource or resources ID that the first signal/channel used) while the remaining part of the paging indication information is carried on a second kind of paging indication signal/channel (e.g., explicitly on the bits field of the second signal/channel). In some embodiments, a UE monitors a part of the paging indication information on a first kind of paging indication signal/channel (e.g., WUS) and the remaining part of the paging indication information on a second kind of paging indication signal/channel (e.g., Paging-PDCCH).

In some embodiments, a part of the paging indication information (e.g., grouping indication information) is carried on a first kind of paging indication signal/channel (e.g., implicitly on the resource or resources ID that the first signal/channel used) while the remaining part of the paging indication information is carried on a first kind of paging indication signal/channel (e.g., explicitly on the bits field of the first signal/channel). In some embodiments, a UE monitors a part of the paging indication information indicated by a first kind of paging indication signal/channel (e.g., WUS, via resource of WUS) and the remaining part of the paging indication information indicated by the first kind of paging indication signal/channel (e.g., WUS, via bit field).

In some embodiments, the paging indication information (e.g., paging indication) is configured by higher layer (e.g., RRC of base station). For example, the paging indication information can be configured to include any one or more of UE group ID, UE ID, 5G-S-TMSI, UE category, UE's RRC state (e.g., RRC_Idle, RRC_Inactive). For example, the paging indication information can be configured as one or more parts of UE group ID, UE ID, 5G-S-TMSI, UE category, UE's RRC state (e.g., RRC_Idle, RRC_Inactive). For example, the paging indication information can be configured as a combination of UE group ID, UE ID, 5G-S-TMSI, UE category, UE's RRC state (e.g., RRC_Idle, RRC_Inactive), paging probability threshold.

In some embodiments, the paging indication information can be associated with any one or more of UE group ID, UE ID, 5G-S-TMSI, UE category, UE's RRC state (e.g., RRC_Idle, RRC_Inactive), paging probability threshold, a power saving level, or a power efficiency level. In some embodiments, the paging indication information may be associated with information of at least one parameter (e.g., UE ID) when the paging indication information includes at least some of the information associated with the at least one parameter (e.g., the paging indication information includes three bits of the UE ID). In some embodiments, a power saving level indicates how much power consumption a UE is expected to save (e.g., high power consumption saving, median power consumption saving, low power consumption saving). In some embodiments, the power saving level can indicate how much a UE is required to save power consumption (e.g., 50% saving, 20% saving, 5% saving). In some embodiments, the power saving level is an assistance information from UE on power saving. In some embodiments, the power saving level is a UE's suggestion to base station on power saving (e.g., high, median, low). In some embodiments, the power saving level is an indication on power saving for UE which comes from a base station (e.g., high, median, low). In some embodiments, the power efficiency level can indicate how much power ratio to total power is allowed be used for a specific communication (e.g., high, median, low). For example, a reduced capability (RedCap) UE of smart watch may have a high power efficiency level. For example, a normal smart phone UE may have a median power efficiency level. In some embodiments, the power efficiency level is an assistance information from UE on power efficiency. In some embodiments, the power efficiency level is an UE's suggestion to base station on power efficiency (e.g., high, median, low). In some embodiments, the power efficiency level is an indication on power efficiency for UE which comes from a base station (e.g., high, median, low).

In some embodiments, the configuration of which parameter(s) is/are present on the first kind of signal/channel is broadcasted on system information block (SIB). In some embodiments, the configuration of which parameter(s) is/are present on the first kind of signal/channel is specified in protocol. For example, the SIB broadcasts the identity or a feature of the first parameter sub-set that are included in the first kind of signal/channel. In some embodiments, the SIB broadcasts that the UE ID sub-set is present or included on the first kind of signal/channel. In some embodiments, the SIB broadcasts that the LSB of UE ID is present on the first kind of signal/channel. In some embodiments, the SIB broadcasts that the last LSB of UE ID is present on the first kind of signal/channel. In some embodiments, the SIB broadcasts that the UE ID sub-set is present on the paging indication signal/channel. In some embodiments, the SIB broadcasts that the UE ID sub-set is present on the wake-up signal/channel (WUS).

In some embodiments, the configuration of which parameter(s) is/are present on the second signal/channel is broadcasted on system information block (SIB). In some embodiments, the configuration of which parameter(s) is/are present on the second signal/channel is specified in protocol. For example, the SIB broadcasts that the second parameter sub-set is present on the second signal/channel. In some embodiments, the SIB broadcasts that the UE ID sub-set is present on the second signal/channel. In some embodiments, the SIB broadcasts that the MSB of UE ID is present on the second signal/channel. In some embodiments, the SIB broadcasts that the first two MSB of UE ID present on the second signal/channel. In some embodiments, the SIB broadcasts that the MSB of UE ID is present on the paging scheduling channel (e.g., Paging-PDCCH). In some embodiments, the SIB broadcasts that the UE group ID is present on the paging scheduling channel (e.g., Paging-PDCCH). In some embodiments, the SIB may include information that identifies the first parameter sub-set that are present in the first kind of signal/channel and the SIB may also include information that identifies the second parameter sub-set that are present in the second signal/channel.

In some embodiments, the paging indication information can be carried on the resource that the signal/channel uses. In some embodiments, the paging indication information can be implicitly carried on the resource that the signal/channel uses. For example, if there were $2^n$ scrambling ID used to transmit this signal/channel, then there will be n bit(s) paging indication information. For another example, if there were $2^n$ control channel element (CCE) offset (e.g., relative to the first CCE) used to transmit this signal/channel, then there will be n bit(s) paging indication information. For still another example, if there were $2^2=4$ radio resource to transmit WUS, then there are 2 bits paging indication information can be implicitly carried on the resource (e.g., 00, 01, 10, 11 on the first, second, third, fourth resource respectively).

In some embodiments, a UE can wake up to monitor incoming paging occasion according to the paging indication information. In some embodiments, a UE can wake up to enter an active state to monitor incoming paging occasion according to the paging indication information. In some embodiments, a UE can skip the incoming paging occasion according to the paging indication information. In some embodiments, the UE behavior (e.g., waking up, skipping) can be configured by base station. In some embodiments, one group of UE (e.g., a normal UE such as enhanced mobile broadband UE, eMIBB UE) can be configured as "waking up". In some embodiments, another group of UE (e.g., reduced capability UE, RedCap UE) can be configured as "skipping" because it is not sensitive to traffic delay.

In some embodiments, a UE can wake up to monitor incoming paging occasion and/or paging message according to the paging indication information. In some embodiments, a UE can skip the incoming paging occasion and/or paging message according to the paging indication information.

In some embodiments, if the number of UE group were higher than a value (e.g., 4), the paging indication information is separately carried on two (or more) signals/channels. In some embodiments, a UE monitors paging indication information on two (or more) signals/channels under some certain condition. In some embodiments, a UE monitors paging indication information on two (or more) signals/channels when there were more than four groups.

In some embodiments, if the UE missed the first kind of signals/channels (e.g., WUS were missed) but the UE received the second kind of signals/channels, then the UE can still work normally but some UE will waste some energy. Under this circumstance, the UE will still monitor the incoming paging occasion. For this problem, the paging indication information carried on the first kind of signals/channels is a sub-set of the paging indication information carried on the second kind of signals/channels. For example, if the paging indication information were UE group ID and the total number of bits of paging indication information were 3 bits, then the first bit (e.g., MSB) of paging indication information (e.g., UE group ID here) can be carried on the first kind of signal/channel (e.g., WUS here) and, the last two bits or all three bit are carried on the second kind of signal/channel (e.g., paging-PDCCH here). For this case, a UE will monitor the first kind of signal/channel for a sub-set of paging indication information while the UE will monitor the second kind of signal/channel for total paging indication information. The advantage of this method is, if the first signal/channel were missed (e.g., the MSB of the 3 bits is lost), the total paging indication information (e.g., all the 3 bits) can still be achieved.

In some embodiments, after detection of the first kind of signals/channels, a UE can stop receiving the second kind of signals/channels. In some embodiments, after detection of the first kind of signals/channels, a UE can stop receiving the second kind of signals/channels if the paging indication information indicates this UE can skip the second kind of signals/channels. In some embodiments, if a UE does not detect the first kind of signals/channels, the UE can detect the second kind of signals/channels.

With at least these method(s) described in this patent document, the false alarm of UE paging can be reduced. Hence, the power consumption of UE can be saved.

Example Techniques #2—Device Identifier and Group Identifier

In current NR system (Rel-15/Rel-16), a UE under RRC_Idle/RRC_Inactive state will receive paging message in every paging cycle. The paging message is carried on PDSCH which is scheduled by the corresponding PDCCH. However, the paging message might not be for this UE. That is, the paging message does not contain the 5G-S-TMSI of this UE. For this case, a false alarm occurs. This false alarm will waste energy of this UE. If the false alarm can be avoided, then the UE can save power consumption.

Before UE receives a paging message, if a paging indication can inform the UE that this UE can skip this reception of paging message (and/or skip reception of the paging PDCCH), then the false alarm can be reduced.

The paging indication can be carried on one, two or more entities. In some embodiments, the paging indication can be carried on existing paging PDCCH or a kind of signal/channel or both. For the case of that the paging indication is carried on existing paging PDCCH and a kind of signal/channel, the large scale information can be carried on a kind of signal/channel while a small scale information can be carried on existing paging PDCCH.

It should be noted that, the "existing paging PDCCH" here may have the same format of paging PDCCH for Rel-15/Rel-16 UE but its content (or bits) might be with re-interpretation.

For example, the 2 MSB of the UE ID will be carried on a kind of signal/channel while the 2 LSB of the UE ID will be carried on existing paging PDCCH where the UE ID is the last 10 bits of 5G-S-TMSI. Here, for convenience of description, the 2 MSB of the UE ID are assumed "10" while the 2 LSB of the UE ID are assumed "01".

At the UE side, after receiving the new signal/channel, the UE with UE ID starts with "10" will continue to receive paging PDCCH while the other UE will continue to sleep. The long sleep will reduce power consumption of UE.

Next, after decoding paging PDCCH, the UE with 2 LSB of UE ID being "01" will continue to receive paging message (on PDSCH) while the other UE will go to sleep. The sleep will reduce power consumption of UE.

In some embodiments, a part of bit(s) from 5G-S-TMSI can be carried on a kind of signal/channel while the other part of bit(s) from 5G-S-TMSI can be carried on existing paging PDCCH. For example, the last $16^{th}$ to $14^{th}$ bits of 5G-S-TMSI are carried on a new signal/channel, the last $13^{th}$ to $11^{th}$ bits of 5G-S-TMSI are carried on existing paging PDCCH.

In some embodiments, the UE group ID (e.g. 0, 1, 2, . . . , 7) is carried on a kind of signal/channel while a part of bit(s) from 5G-S-TMSI is/are carried on existing paging PDCCH. In some embodiments, the UE group ID is given by higher layer.

In some embodiments, if the paging indication information were UE ID (e.g., a sub-set of UE ID, e.g., last 3 bits of UE ID, or, first 3 bits of UE ID), then a first sub-set of paging indication information (e.g., first bit of paging indication information, e.g., last bit of the last 3 bits of UE ID) can be carried on the first kind of signal/channel (e.g., WUS) while all the paging indication information (e.g., last 3 bits of UE ID) are carried on the second kind of signal/channel (e.g., paging PDCCH). If the last 3 bits of UE ID were "101", then, after detecting of the first kind of signal/channel (e.g., WUS), a UE knows the last bit of the last 3 bits of UE ID is "1". If the last bit of the last 3 bits of the UE ID itself were "1", then this UE will be paged. If the last bit of the last 3 bits of the UE ID itself were "0", then this UE will not be paged and this UE can go to sleep mode (or, stay in sleep mode). After detecting of the second kind of signal/channel (e.g., paging PDCCH), this UE knows all the bits of the last 3 bits of UE ID and, this UE can check whether this paging indication information from these two signals/channels are consistent or not. In some embodiments, a first information from a first signal/channel is consistent with a second information from a second signal/channel if the first information is same as second information or if the first information and the second information have at least some information that is the same, as explained in this patent document. In some embodiments, a first information from a first signal/channel is not consistent with a second information from a second signal/channel if the first information is not the same as second information or if the first information and the second information have at least some information that is not the same, as explained in this patent document.

If this paging indication information from these two signals/channels were not consistent, then this UE can skip/stop receiving of paging message. If this paging indication information from these two signals/channels were not consistent, then this UE can continue to receive paging message. If this paging indication information from these two signals/channels were not consistent, then this UE can discard this paging indication information. If this paging indication information from these two signals/channels were not consistent, then this UE can discard this paging indication information and continue to receive paging message. If this paging indication information from these two signals/channels were not consistent, then this UE can discard this paging indication information and go to sleep (or, keep sleep). If this paging indication information from these two signals/channels were not consistent, then this UE can discard the paging indication information from the first kind of signal/channel (e.g., WUS) and execute a procedure according the paging indication information from the second kind of signal/channel (e.g., paging PDCCH).

In some embodiments, the said UE ID can be in a form of its hash function (e.g., modular operation). In some embodiments, the said UE ID can be in a form of the hash function of 5G-S-TMSI. In some embodiments, the said UE ID can be in a form of the hash function of sub-set of 5G-S-TMSI. For example, if the UE ID is X, then the value Z=mod(UE ID, Y) is carried on the first kind of signal/channel (e.g., WUS) where Y is an integer. In some embodiments, a sub-set of Z (e.g., in form of binary, e.g., some bits) can be carried on the first kind of signal/channel (e.g., WUS) while another sub-set of Z (e.g., in form of binary, e.g., some bits) can be carried on the second kind of signal/channel (e.g., paging PDCCH). In some embodiments, a UE under RRC_Idle/RRC_Inactive state can monitor a first kind of signal/channel (e.g., WUS) for a sub-set of UE ID with hash function. In some embodiments, a UE under RRC_Idle/RRC_Inactive state can monitor a second kind of signal/channel (e.g., paging PDCCH) for another sub-set of UE ID with hash function.

In some embodiments, the paging indication information can be power consumption sensitivity. The power consumption sensitivity is, whether a UE is sensitive to power consumption or not. For example, 4 levels are applied: not sensitive, low sensitive, median sensitive, high sensitive. In some embodiments, a sub-set (e.g., the first bit, the first bit of index) of power consumption sensitivity is carried on the first kind of signal/channel (e.g., WUS) while another sub-set (e.g., all the bits, all the bits of index) of power consumption sensitivity is carried on the second kind of signal/channel (e.g., paging PDCCH). In some embodiments, a UE under RRC_Idle/RRC_Inactive state can monitor a first kind of signal/channel (e.g., WUS) for a sub-set of power consumption sensitivity. In some embodiments, a UE under RRC_Idle/RRC_Inactive state can monitor a second kind of signal/channel (e.g., paging PDCCH) for all information of power consumption sensitivity. In some embodiments, a UE under RRC_Idle/RRC_Inactive state can monitor a second kind of signal/channel (e.g., paging PDCCH) for rest/remaining information of power consumption sensitivity. In some embodiments, a UE under RRC_Idle/RRC_Inactive state can monitor a second kind of signal/channel (e.g., paging PDCCH) for a sub-set of power consumption sensitivity.

In some embodiments, the paging indication information can base on UE group information. For example, group-common related paging indication information is carried on the first kind of signal/channel (e.g., WUS). The group-specified paging indication information is carried on the second kind of signal/channel (e.g., paging PDCCH). For example, if all the UE should receive the system information change indication, then the system information change indication present on the first kind of signal/channel (e.g., WUS). During this paging cycle, if two UE groups should also receive paging message, then the UE group ID is also present on the second kind of signal/channel (e.g., paging PDCCH).

In some embodiments, the UE group ID (or UE ID) is determined by at least one of a whole or part(s) of UE group ID, UE ID, 5G-S-TMSI, UE category, UE's RRC state, or paging probability threshold. For example, if the UE group ID has three bits, then the first bit can come from UE category (bit "0" for eMBB UE, bit "1" for RedCap UE) and this bit is carried on the first kind of signal/channel (e.g., WUS). The second bit and third bit of UE group ID can come from UE ID (e.g., last 2 LSB of UE ID) and these two bits are carried on the second kind of signal/channel (e.g., paging PDCCH).

In some embodiments, a value (or codepoint) of paging indication information can be carried on the first kind of signal/channel (e.g., WUS). In some embodiments, a value (or codepoint) of paging indication information can be carried on the second kind of signal/channel (e.g., paging PDCCH). For example, if the paging indication information had 3 bits, then there will be 2³=8 values (or codepoints): 0, 1, 2, 3, 4, 5, 6, 7. These 8 values (or codepoints) can be used to indicate one or more UE ID which is/are paged or not. For example, for value 0, none of UE ID is paged. For value 1, 2, 3, 4, 5, the decimal value plus one of last 3 LSB of UE ID will be paged. For value 6, all UE can receive system information change and/or earthquake and tsunami warning system (ETWS) information. For value 7, all UE will be paged. In some embodiments, a sub-set of value (or codepoint, e.g., value 0 and value 1) can be carried on the first kind of signal/channel (e.g., WUS). In some embodiments, a sub-set of value (or codepoint, e.g., value 2-7) can be carried on the second kind of signal/channel (e.g., paging PDCCH).

The paging indication (or paging indication information) can have one or more parts. For example, if the paging indication information is UE ID which has 10 bits, then the first part of the paging indication information can be a first number of bits of a parameter (e.g., the first three bits of UE ID) and, the second part of the paging indication information can be a second remaining number of bits of the parameter (e.g., the last four bits of UE ID). The paging indication information can have one or more parameters. For example, if the paging indication information contains UE ID and UE category, then the first part of the first parameter of the paging indication information can be the first bit of UE ID and, the second part of the first parameter of the paging indication information can be the last two bits of UE ID.

In some embodiments, an information field of a signal/channel (e.g., WUS) can carry paging indication information directly. For example, if the WUS has 8 bits of information field, then this information field can indicate operation of 8 UE groups separately with one-to-one mapping.

With at least these method(s) described in this patent document, the false alarm of UE paging can be reduced. Hence, the power consumption of UE can be saved.

Example Techniques #3—Paging Probability Threshold

In current NR system (Rel-15/Rel-16), a UE under RRC_Idle/RRC_Inactive state will receive paging message in every paging cycle. The paging message is carried on PDSCH which is scheduled by the corresponding PDCCH. However, the paging message might not be for this UE. That is, the paging message does not contain the 5G-S-TMSI of this UE. For this case, a false alarm occurs. This false alarm will waste energy of this UE. If the false alarm can be avoided, then the UE can save power consumption.

Before UE receives a paging message, if a paging indication can inform the UE that this UE can skip this reception of paging message (and/or skip reception of the paging PDCCH), then the false alarm can be reduced.

The paging indication can be carried on one, two or more entities. In some embodiments, the paging indication can be carried on existing paging PDCCH or a kind of signal/channel or both. For the case of that the paging indication is carried on existing paging PDCCH and a kind of signal/channel, the large scale information can be carried on a kind of signal/channel while a small scale information can be carried on existing paging PDCCH.

Figure 4:
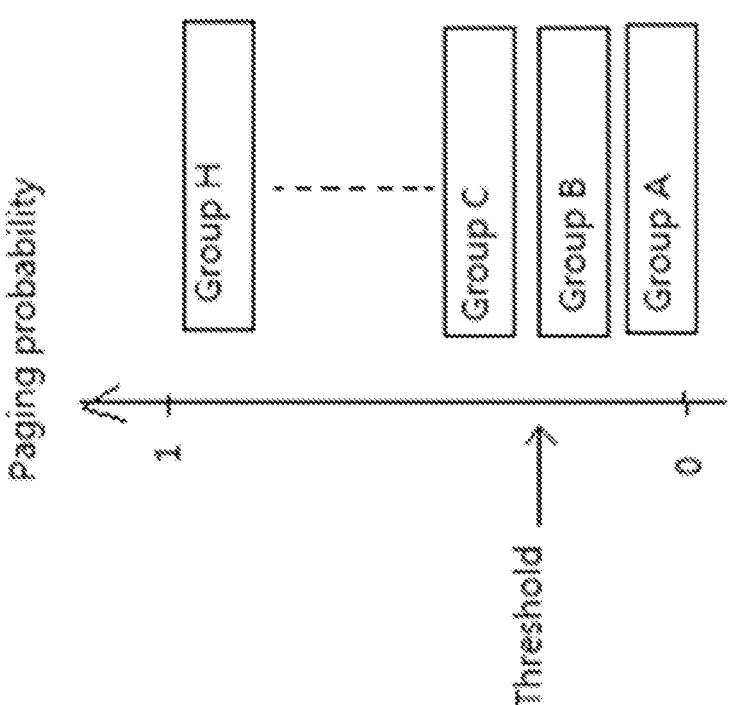
FIG. 4 shows a grouping of communication devices into paging probabilities.

For example, as shown in FIG. 4, 8 UE groups are divided according to paging probability (from 0 to 1). Now, a first paging probability threshold (or, the index of paging probability threshold) will be carried on a kind of signal/channel while a second paging probability threshold (or, the index of paging probability threshold) will be carried on existing paging PDCCH. Here, for the convenience of description, the first paging probability threshold (or, the index of paging probability threshold) lies between UE group B and UE group C (e.g., UE group A and UE group B will not be paged while UE group C to UE group H might be paged). The second paging probability threshold lies between UE group F and UE group G (e.g., UE group C to UE group F will not be paged while UE group G to UE group H might be paged).

At the UE side, after receiving the first kind of signal/channel (e.g., WUS), the UE with a paging probability being higher than the first paging probability threshold will continue to receive paging PDCCH while the other UE will continue to sleep. The long sleep will reduce power consumption of UE.

Next, after decoding paging PDCCH, the UE with a paging probability being higher than the second paging probability threshold will continue to receive paging message (on PDSCH) while the other UE will go to sleep. The sleep will reduce power consumption of UE.

For example, if the paging indication is paging probability and there were 7 paging probability threshold index (e.g., 7+1=8 UE groups here) 000,001,010, 011, 100, 101, 110, then the first bit (e.g., MSB. Now, it is assumed that MSB '1') is carried on the first kind of signal/channel (e.g., WUS) and the last 2 bits (now, assumed "01") are carried on the second kind of signal/channel (e.g., Paging-PDCCH). After detecting the first kind of signal/channel (e.g., WUS), a UE knows the first paging probability threshold index is one of 100,101,110. That is, the last four UE group can be paged. After detecting the second kind of signal/channel (e.g., Paging-PDCCH), the UE knows the second paging probability threshold index is 01. Combining these two paging probability threshold indices together, this UE gets the overall paging probability threshold index 101. That is, the sixth paging probability threshold index. That is, the last two UE group will be paged while the first 6 UE group will not be paged.

In some embodiments, the UE group ID can be in a form of bitmap (e.g., a bit "1" indicates this UE group is addressed while a bit "0" indicates this UE group is not addressed). For example, a bitmap "10010000" indicates the first UE group and fourth UE group are addressed/paged.

In some embodiments, a paging probability threshold (or, paging probability threshold index) is carried on the first kind of signal/channel (e.g., WUS) while the UE group ID is carried on the second kind of signal/channel (e.g., Paging-PDCCH). In some embodiments, a paging probability threshold (or, paging probability threshold index) is carried on the first kind of signal/channel (e.g., WUS) while the paging probability threshold and the UE group ID are carried on the second kind of signal/channel (e.g., Paging-PDCCH). In some embodiments, a UE under RRC_Idle/RRC_Inactive state will monitor the first kind of signal/channel (e.g., WUS) for the paging probability threshold (or, paging probability threshold index) while this UE will monitor the second kind of signal/channel (e.g., Paging-PDCCH) for the UE group ID.

In some embodiments, a paging probability threshold (or, paging probability threshold index) is carried on the first kind of signal/channel (e.g., WUS) while the UE ID is carried on the second kind of signal/channel (e.g., Paging-PDCCH). In some embodiments, a paging probability threshold (or, paging probability threshold index) is carried on the first kind of signal/channel (e.g., WUS) while the paging probability threshold and the UE ID are carried on the second kind of signal/channel (e.g., Paging-PDCCH). In some embodiments, a UE under RRC_Idle/RRC_Inactive state will monitor the first kind of signal/channel (e.g., WUS) for the paging probability threshold (or, paging probability threshold index) while this UE will monitor the second kind of signal/channel (e.g., Paging-PDCCH) for the UE ID.

In some embodiments, a first sub-set of tracking reference signal (TRS) indication information and/or channel state information reference signal (CSI-RS) indication information is carried on the first kind of signal/channel (e.g., WUS) while a second sub-set of TRS/CSI-RS indication information is/are carried on the second kind of signal/channel (e.g., Paging-PDCCH). In some embodiments, a present indication information included in a first kind of signal/channel (e.g., WUS) can indicate whether the TRS/CSI-RS will present later or not. In some embodiments, a UE under RRC_Idle/RRC_Inactive state will monitor the first kind of signal/channel (e.g., WUS) for the present indication information while this UE will monitor the second kind of signal/channel (e.g., Paging-PDCCH) for the set(s) of TRS/CSI-RS configuration. For example, the WUS indicates whether the TRS/CSI-RS will be present before the incoming paging occasion (PO) while the Paging-PDCCH indicates which set(s) or set(s) of TRS/CSI-RS configuration will present before the incoming PO. For example, if the TRS/CSI-RS will present and the third set of TRS/CSI-RS configuration will present before the incoming PO, then a UE will monitor WUS for the presence indication of TRS/CSI-RS and, this UE will monitor Paging-PDCCH for which set of TRS/CSI-RS configuration will present before the incoming PO. These TRS/CSI-RS indication information will help UE for time/frequency tracking which will reduce the power consumption.

With at least these method(s) described in this patent document, the false alarm of UE paging can be reduced. Hence, the power consumption of UE can be saved.

Example Techniques #4—Grouping Information Implicitly Included in WUS and/or Paging-PDCCH In current NR system (Rel-15/Rel-16), a UE under RRC_Idle/RRC_Inactive state will receive paging message in every paging cycle. The paging message is carried on PDSCH which is scheduled by the corresponding PDCCH. However, the paging message might not be for this UE. That is, the paging message does not contain the 5G-S-TMSI of this UE. For this case, a false alarm occurs. This false alarm will waste energy of this UE. If the false alarm can be avoided, then the UE can save power consumption.

Before UE receives a paging message, if a paging indication can inform the UE that this UE can skip this reception of paging message (and/or skip reception of the paging PDCCH), then the false alarm can be reduced.

The paging indication can be carried on one, two or more entities. In some embodiments, the paging indication can be carried on existing paging PDCCH or a kind of signal/channel or both. In some embodiments, the paging indication information can be UE ID, UE group ID, 5G-S-TMSI, UE category, UE's RRC state, or paging probability threshold, UE's release version (e.g., Rel-15, Rel-16, Rel-17, Rel-18, or later). In some embodiments, the paging indication information can be a sub-set of UE ID, UE group ID, 5G-S-TMSI, UE category, UE's RRC state, or paging probability threshold. In some embodiments, the paging indication information can be a combination of UE ID, UE group ID, 5G-S-TMSI, UE category, UE's RRC state, or paging probability threshold.

In some embodiments, the paging indication information can be implicitly carried on existing paging PDCCH and/or a kind of signal/channel. In some embodiments, the paging indication information can be implicitly carried on existing paging PDCCH and/or a kind of signal/channel via the resource allocation, sequence generation, radio network temporary identification (RNTI), scrambling ID of signal/channel.

For example, if the paging indication information is the last three LSB of UE ID, then these three LSB of UE ID can be carried on the resource (e.g., resource allocation). For example, if there are $2^3=8$ resources for the first kind of signal/channel (e.g., WUS), then the LSB of 000,001,010, 011, 100, 101, 110, 111 comes implicitly from the first, second, third, fourth, fifth, seventh, eighth resource for the first kind of signal/channel (e.g., WUS). That is, different resource implicitly has different paging indication information. At the receiver (e.g., UE side), after a successful decoding of the first kind of signal/channel (e.g., WUS) with one of 8 resources, the receiver can know the UE that will be paged by the network from the three LSB of UE ID. The UE with different three LSB of UE ID can go to sleep (or keep sleep) to save power consumption.

For another example, if the paging indication information is the MSB of UE ID, then this MSB of UE ID can be implicitly carried on the sequence generation of the first kind of signal/channel (e.g., WUS, e.g., the demodulation reference signal (DM-RS) of PDCCH/PDSCH). If the MSB is "0", the first sequence is generated for the first kind of signal/channel. If the MSB is "1", the second sequence is generated for the first kind of signal/channel.

For still another example, if the paging indication information is the UE group ID with two bits, then these two bits can be implicitly carried on the RNTI for the first kind of signal/channel (e.g., WUS). For example, these two bits 00, 01, 10, 11 represent the first, second, third, fourth RNTI for the first kind of signal/channel (e.g., WUS). At the receiver (e.g., UE side), after a successful decoding of the first kind of signal/channel (e.g., WUS) with one of four RNTI, the receiver can know the UE group that will be paged by the network from the UE group ID. The UE in other group(s) can go to sleep (or keep sleep) to save power consumption. In some embodiments, the scrambling ID can also implicitly carry paging indication information (including UE grouping) with similar method of RNTI.

With at least these method(s) described in this patent document, the false alarm of UE paging can be reduced. Hence, the power consumption of UE can be saved.

Example Techniques #5—Techniques for Managing Paging Occasions for RedCap UE

For a normal $5^{th}$ Generation mobile communication system, e.g., New Radio access technology (5G-NR) User Equipment (UE), it might have one, two, four or more antennas to receive or transmit signal. However, with the increment number of antenna, the complexity and power consumption will also increase.

For industrial wireless sensor, video surveillance device, wearable device (such as smart watch, a watch with telephone) etc., these devices might have small form factors. In addition, these devices might be powered by battery that requires low power consumption. As the result of that, these devices might have one or two antennas to receive signal and one antenna to transmit signal. Compared with the normal 5G-NR UE, these reduced capability UE (RedCap UE) might have limited coverage because of limited number of antennas.

For a RedCap UE, the antenna Rx/Tx efficiency might be lower (−3 dB) because of small size of form factor (e.g., wearable watch). Hence, the coverage for uplink (UL)/downlink (DL) signal/channel should be enhanced.

If the RedCap UE were permitted to access the normal 5G-NR networks, then these UE will consume a lot of radio resources but the efficiency of radio resource will be very low (because of limited number of antennas and, antenna Rx/Tx efficiency). This will impact the quality of user experiment (QoE) of normal UE because most radio resources will be occupied by the RedCap UE. Hence, the network operator should be capable of blocking the access of these UE to a (normal) network. That is, a UE should indicate itself to the network whether it is a RedCap UE or not.

In a radio communication system such as the 5G-NR system, the receiving antenna is helpful to capture energy of signal but it also consumes UE's battery. If the number of receiving antenna of a UE decreased from four to two, or from two to one, then the coverage of this UE will decrease 3 dB or more. If the number of receiving antenna of a UE decreased from four to one, then the coverage of this UE will decrease 6 dB or more. Too much reduction of coverage of signal will bring UE out of service.

In the 5G-NR system, the traffic is scheduled by a base station. The traffic might be scheduled by configured scheduling (CS, e.g., configuration by radio resources management, RRC), semi-persistent scheduling (SPS) or a dynamic scheduling.

For a dynamic scheduling, there is a Physical Downlink Control Channel (PDCCH) for granting the radio resources for a UE. If the PDCCH is not decoded correctly, then the traffic will not flow and the radio resource for corresponding Physical Downlink Shared Channel (PDSCH) or Physical Uplink Shared Channel (PUSCH) is wasted. By the way, the CS and SPS are established after the successful dynamic scheduling.

For a RedCap UE, the PDCCH tends to be ruined by noise and interference because of limited number of antenna. It is necessary to research some methods to improve the coverage of PDCCH for the RedCap UE.

In addition, some other signals/channels are also required to have similar some methods to improve their coverage.

For a RedCap UE, the coverage of PDCCH might be impacted by the reduction number of receiving antenna. Hence, some solutions to the coverage of PDCCH, such as repetition should be introduced.

When a RedCap UE is accessing the network, a reliable communication between UE and network should be assured. Hence, a RedCap UE should indicate its feature of RedCap. With this indication, the network can schedule this RedCap UE with a robust mechanism.

To this end, some detailed examples are provided as the following.

Relative to a normal UE, a RedCap UE may have half number of receiving antennas (Rx). Hence, the coverage of downlink signal and channel is limited (3 dB or 6 dB worse than that of a normal UE). Some methods should be applied to improve the coverage of downlink signal and channel. PDCCH repetition is one of those methods to improve the coverage of PDCCH.

For a RedCap UE under RRC_Idel/RRC_Inactive state, it should monitor paging occasion (PO) during its paging frame. Because of reduced capability (e.g., this RedCap UE has only one receiving antenna), the signal coverage for this UE might be lower than a normal UE (with two or four receiving antennas). That is, the coverage of paging message might be limited.

For this case, some method should be applied to improve the coverage of paging message.

The SSB before PO is used for synchronization, AGC, etc. by a UE under RRC_Idel/RRC_Inactive state. If the coverage of SSB were limited, then the coverage of paging message will be limited. Hence, the coverage of SSB should be improved for a RedCap UE.

The SSB can have several repetitions within one period. For example, if the period of SSB is P=20 milli-seconds (ms), then the SSB can repeat K=4 times while each repeated transmission have P/K=5 ms apart. Alternatively, if the period of SSB is P=20 slot, then the SSB can repeat K=4 times while each repeated transmission have P/K=5 slot apart. Alternatively, if the period of SSB is P=20 ms, then the SSB can repeat K=2 times while each repeated transmission have P/K=10 ms apart. A K=2 repetitions can have a 3 dB gain in coverage of SSB. Alternatively, if the period of SSB is P=20 ms, then the SSB can repeat K=5 times while each repeated transmission have P/K=4 ms apart. Alternatively, for each repeated transmission of SSB, it has the identical beam direction. Alternatively, each repeated transmission of SSB is QCL with the first SSB. Alternatively, each repeated transmission of SSB is QCL with the first SSB within the period of SSB (e.g., P). With this method, the UE receiver can combine multiple repetitions together. Hence the SNR of SSB can be improved which improves the coverage of SSB.

Alternatively, the repeated SSB is/are transmitted unevenly. For example, for the K=2 repetitions within the P=20 ms period, the repeated K=2 SSB locate in K=2 contiguous slots (e.g., slot 0 and slot 1 where a slot has one milli-seconds). For another example, for the K=3 repetitions within the P=20 ms period, the repeated K=3 SSB locate in slot 0, 5, 10 where a slot has one milli-seconds.

Alternatively, if one repeated transmission of SSB overlapped with another SSB, then this repeated transmission of SSB will not happen. That is, a UE should not expect that a repeated transmission of SSB overlaps with another SSB. Alternatively, a UE should not expect that a repeated transmission of SSB overlaps with another SSB in any PRB/PRB pair.

Equivalently, the SSB can have shorter period. For example, the SSB can have a period of 2 ms, 4 ms, 5 ms, 10 ms, 15 ms. Alternatively, if the period of SSB were smaller than a duration P, then the content of SSB should be identical within a duration P. Alternatively, if the period of SSB were smaller than 20 ms, then the content of SSB should be identical with a duration P=20 ms. Alternatively, if the period of SSB were smaller than 20 ms, then the content of SSB should be identical within SFN mod 2=0, 1. Where the SFN is system frame number (from 0 to 1023). For example, the SSB for SFN=0 and SFN=1 have the identical content of SSB while the SSB for SFN=1 and SFN=2 have not. With this method, a UE can combine several SSB within a period which will improve the coverage of SSB.

The SSB can have power boosting. Alternatively, the SSB can have power boosting relative to its pre-defined value. Alternatively, each repeated transmission of SSB can have power boosting. Alternatively, each repeated transmission of SSB except the first SSB can have power boosting. Alternatively, each repeated transmission of SSB within the period of SSB (e.g., P) except the first SSB can have power boosting. Alternatively, each repeated transmission of SSB within the period of SSB (e.g., P) except the first SSB can have power boosting relative to the power of the first SSB. For example, if the period of SSB is P=20 ms and the SSB repeats K=2 times, then there will be K=2 SSB with the period P=20 ms and, the first SSB will not have power boosting and, the second SSB has a power boosting relative to the power of the first SSB (e.g., +3 dB). The advantage of this method is, the normal UE can utilize the first SSB while the RedCap UE can utilize all the SSB to achieve more energy. Hence, the coverage of SSB can be improved. Alternatively, the RedCap UE can utilize the SSB with power boosting (e.g., the second SSB) to save UE power consumption (because of no reception of the first SSB).

Alternatively, the value of power boosting of SSB can be broadcasted (e.g., via system information) or specified in the protocol. Alternatively, each repeated transmission of SSB can have different value of power boosting. Alternatively, each repeated transmission of SSB can have different value of power boosting relative to the first SSB. For example, for a K=4 SSB with the period P=20 ms, the power boosting of the first, second, third, fourth SSB is 0, +1, +2, +3 dB respectively. With this method, different UE with different coverage level can utilize different SSB. For example, the normal UE can utilize the first SSB, the UE with coverage level 1, 2, 3 can utilize the second, third, fourth SSB respectively.

With this method, the coverage of SSB can be improved.

Example Techniques #6—Paging Enhancement

For a RedCap UE under RRC_Idel/RRC_Inactive state, it should monitor paging occasion (PO) during its paging frame. Because of reduced capability (e.g., this RedCap UE has only one receiving antenna), the signal coverage for this UE might be lower than a normal UE (with two or four receiving antennas). That is, the coverage of paging message might be limited.

For this case, some method should be applied to improve the coverage of paging message.

The PDSCH that carries paging message (e.g., paging-PDSCH) can be transmitted with repetition. Alternatively, the paging-PDSCH can be repeatedly transmitted within a paging frame. Alternatively, the paging-PDSCH can be repeatedly transmitted with K times in a paging frame. For example, the paging-PDSCH is transmitted with K=1, 2, 4, 8 repetitions within a paging frame. Alternatively, the paging-PDSCH is transmitted with K=1, 2, 4, 8, 16, 32, 64, 128 repetitions across one or more paging frames. Alternatively, the paging-PDSCH is transmitted with K=1, 2, 4, 8, 16, 32, 64, 128, 256, 512, 1024 repetitions from the paging frame(s).

Alternatively, the paging-PDSCH can be repeatedly transmitted within N paging frames, the N is number of total paging frames within a paging cycle. The N is configured by higher layer (such as N=1, 2, 3, 4). For example, when N is one, the paging-PDSCH is transmitted with K=1, 2, 4, 8 repetitions. For another example, when N is two, the paging-PDSCH is transmitted with K=1, 2, 4, 8, 16 repetitions across N=2 paging frames. For still another example, when N is three, the paging-PDSCH is transmitted with K=1, 2, 4, 8, 16, 30 repetitions across N=3 paging frames. For still another example, when N is four, the paging-PDSCH is transmitted with K=1, 2, 4, 8, 16, 40 repetitions across N=4 paging frames. Alternatively, the paging-PDSCH is transmitted with K=1, 2, 3, . . . , 10N−1, 10N repetitions across N paging frames.

Alternatively, the PDCCH that schedules paging-PDSCH can be repeatedly transmitted. Alternatively, the PDCCH that schedules paging-PDSCH can be repeatedly transmitted with companion of paging-PDSCH.

Because of limited radio resource, some channel/signal might collide with each other in time domain or frequency domain. When a repetition of paging-PDSCH or the PDCCH that schedules paging-PDSCH overlaps with the transmission of the PDSCH that carries system information, this transmission of paging-PDSCH or the PDCCH that schedules paging-PDSCH will not happen. A UE should not expect an overlapped transmission of paging-PDSCH or the PDCCH that schedules paging-PDSCH with the transmission of the PDSCH that carries system information, Alternatively, when a repetition of paging-PDSCH or the PDCCH that schedules paging-PDSCH overlaps with the transmission of the PDSCH that carries system information, this transmission of paging-PDSCH or the PDCCH that schedules paging-PDSCH will not happen but it is counted a transmission of the repetition of paging-PDSCH or the PDCCH that schedules paging-PDSCH.

Alternatively, when a repetition of paging-PDSCH or the PDCCH that schedules paging-PDSCH overlaps with the transmission of the PDSCH that carries system information block, this transmission of paging-PDSCH or the PDCCH that schedules paging-PDSCH will not happen but it is counted a transmission of the repetition of paging-PDSCH or the PDCCH that schedules paging-PDSCH. A UE should not expect an overlapped transmission of paging-PDSCH or the PDCCH that schedules paging-PDSCH with the transmission of the PDSCH that carries system information block.

Alternatively, when a repetition of paging-PDSCH or the PDCCH that schedules paging-PDSCH overlaps with the transmission of the PDSCH that carries system information block 1 (e.g., SIB1), this transmission of paging-PDSCH or the PDCCH that schedules paging-PDSCH will not happen but it is counted a transmission of the repetition of paging-PDSCH or the PDCCH that schedules paging-PDSCH. A UE should not expect an overlapped transmission of paging-PDSCH or the PDCCH that schedules paging-PDSCH with the transmission of the PDSCH that carries system information block 1.

Alternatively, when a repetition of paging-PDSCH or the PDCCH that schedules paging-PDSCH overlaps with the transmission of the PDSCH that carries system information block 2 (e.g., SIB2), this transmission of paging-PDSCH or the PDCCH that schedules paging-PDSCH will not happen but it is counted a transmission of the repetition of paging-PDSCH or the PDCCH that schedules paging-PDSCH. A UE should not expect an overlapped transmission of paging-PDSCH or the PDCCH that schedules paging-PDSCH with the transmission of the PDSCH that carries system information block 2.

Alternatively, when a repetition of paging-PDSCH or the PDCCH that schedules paging-PDSCH overlaps with the transmission of SSB, this transmission of paging-PDSCH or the PDCCH that schedules paging-PDSCH will not happen. Alternatively, when a repetition of paging-PDSCH or the PDCCH that schedules paging-PDSCH overlaps with the transmission of SSB, this transmission of paging-PDSCH or the PDCCH that schedules paging-PDSCH will not happen but it is counted a transmission of the repetition of paging-PDSCH or the PDCCH that schedules paging-PDSCH. A UE should not expect an overlapped transmission of paging-PDSCH or the PDCCH that schedules paging-PDSCH with the transmission of SSB, Alternatively, when a repetition of paging-PDSCH or the PDCCH that schedules paging-PDSCH overlaps with the transmission of PDCCH that is associated with CORESET 0, this transmission of paging-PDSCH or the PDCCH that schedules paging-PDSCH will not happen. Alternatively, when a repetition of paging-PDSCH or the PDCCH that schedules paging-PDSCH overlaps with the transmission of PDCCH that is associated with CORESET 0 while the PDCCH that schedules paging-PDSCH is not associated with CORESET 0, this transmission of paging-PDSCH or the PDCCH that schedules paging-PDSCH will not happen. A UE should not expect an overlapped transmission of paging-PDSCH or the PDCCH that schedules paging-PDSCH with the transmission of PDCCH that is associated with CORESET 0.

A UE should not expect an overlapped transmission of paging-PDSCH or the PDCCH that schedules paging-PDSCH with the transmission of PDCCH that is associated with CORESET 0 while the PDCCH that schedules paging-PDSCH is not associated with CORESET 0.

Alternatively, when a repetition of paging-PDSCH or the PDCCH that schedules paging-PDSCH overlaps with the transmission of PDCCH that is associated with CORESET 0, this transmission of paging-PDSCH or the PDCCH that schedules paging-PDSCH will not happen but it is counted a transmission of the repetition of paging-PDSCH or the PDCCH that schedules paging-PDSCH. Alternatively, when a repetition of paging-PDSCH or the PDCCH that schedules paging-PDSCH overlaps with the transmission of PDCCH that is associated with CORESET 0 while the PDCCH that schedules paging-PDSCH is not associated with CORESET 0, this transmission of paging-PDSCH or the PDCCH that schedules paging-PDSCH will not happen but it is counted a transmission of the repetition of paging-PDSCH or the PDCCH that schedules paging-PDSCH.

Alternatively, when a repetition of paging-PDSCH or the PDCCH that schedules paging-PDSCH overlaps with the transmission of PDCCH that is associated with search space 0, this transmission of paging-PDSCH or the PDCCH that schedules paging-PDSCH will not happen. Alternatively, when a repetition of paging-PDSCH or the PDCCH that schedules paging-PDSCH overlaps with the transmission of PDCCH that is associated with search space 0 while the PDCCH that schedules paging-PDSCH is not associated with search space 0, this transmission of paging-PDSCH or the PDCCH that schedules paging-PDSCH will not happen. A UE should not expect an overlapped transmission of paging-PDSCH or the PDCCH that schedules paging-PDSCH with the transmission of PDCCH that is associated with search space 0. A UE should not expect an overlapped transmission of paging-PDSCH or the PDCCH that schedules paging-PDSCH with the transmission of PDCCH that is associated with search space 0 while the PDCCH that schedules paging-PDSCH is not associated with search space 0.

Alternatively, when a repetition of paging-PDSCH or the PDCCH that schedules paging-PDSCH overlaps with the transmission of PDCCH that is associated with search space 0, this transmission of paging-PDSCH or the PDCCH that schedules paging-PDSCH will not happen but it is counted a transmission of the repetition of paging-PDSCH or the PDCCH that schedules paging-PDSCH. Alternatively, when a repetition of paging-PDSCH or the PDCCH that schedules paging-PDSCH overlaps with the transmission of PDCCH that is associated with search space 0 while the PDCCH that schedules paging-PDSCH is not associated with search space 0, this transmission of paging-PDSCH or the PDCCH that schedules paging-PDSCH will not happen but it is counted a transmission of the repetition of paging-PDSCH or the PDCCH that schedules paging-PDSCH.

The paging-PDSCH may carry several message. For example, it can carry 32 messages for 32 UE with different UE identification (e.g., 5G-S-TMSI, each has 48 bits). If the channel condition were not much good (e.g., for a RedCap UE at cell edge with one receiving antenna), a RedCap UE might not capable to decode the paging-PDSCH with large block size of paging message. Hence, it is appreciative that a small block size of paging message can be carried on paging-PDSCH. To this end, a scaling factor can be applied for paging-PDSCH. For example, if the paging message has transport block size TBS=160 bits and the scaling factor SF=1/5, then the PDCCH that schedules paging-PDSCH can indicate a value of TBS/SF=160/(1/5)=800 bits on paging-PDSCH. When this UE received the TBS indication of 800 bits on paging-PDSCH, this UE will compute the actual TB Size 800*SF=800*(1/5)=160 bits. Alternatively, the scaling factor can be less than 2/5. Alternatively, the scaling factor can be one of {1/3, 1/4, 1/5, 1/6, 1/8, 1/12, 1/16}.

With this method, the coverage of PO (e.g., paging-PDCCH and/or paging-PDSCH) can be improved.

Figure 5:
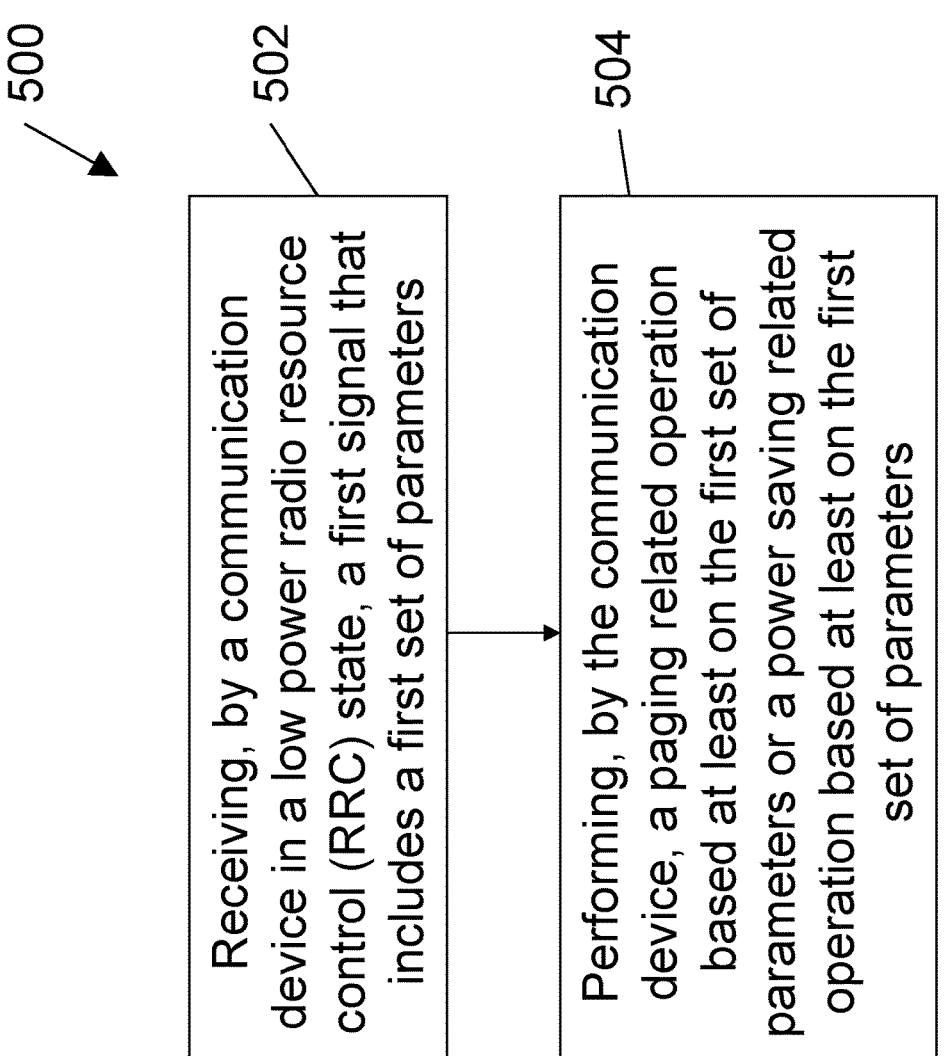
FIGS. 5 to 7 show example flowcharts for performing paging cycle related operations.

FIG. 5 shows a flowchart of an example method 500 for performing a paging related operation or a power saving related operation. Operation 502 includes receiving, by a communication device in a low power radio resource control (RRC) state, a first signal that includes a first set of parameters. Operation 504 includes performing, by the communication device, a paging related operation based at least on the first set of parameters or a power saving related operation based at least on the first set of parameters.

In some embodiments of method 500, the method further includes receiving, by the communication device in the low power RRC state before the performing, a second signal that includes a second set of parameters, the paging related operation is based on the first set of parameters and the second set of parameters, and the power saving related operation is based on the first set of parameters and the second set of parameters. In some embodiments of method 500, the first set of parameters or the second set of parameters includes any one or more of following listed parameters: a group identifier of a group to which the communication device or another communication device belongs, a device identifier of the communication device or the another communication device, a 5G S-Temporary Mobile Subscriber Identifier (5G-S-TMSI) of the communication device or the another communication device, a category to which the communication device or the another communication device belongs, a radio resource control (RRC) state, a paging probability threshold value, a power saving level, a power efficiency level, a tracking reference signal (TRS) indication information, and a channel state information reference signal (CSI-RS) indication information.

In some embodiments of method 500, the first set of parameters includes at least a first parameter that includes a subset of information of one parameter from the listed parameters, and the second set of parameters includes at least a second parameter that includes a remaining subset of information of the one parameter from the listed parameters, and a complete information of the one parameter comprises the subset of information and the remaining subset of information. In some embodiments of method 500, N parameters indicate a total number of the listed parameters, the first set of parameters includes N1 parameters from the listed parameters, the second set of parameters includes N2 parameters from the listed parameters, N, N1, and N2 are integers, N is greater than or equal to 2, and N is equal to N1+N2. In some embodiments of method 500, the first set of parameters include a same set of parameters as the second set of parameters. In some embodiments of method 500, the first set of parameters are different from the second set of parameters. In some embodiments of method 500, the first set of parameters includes the group identifier and the second set of parameters include the device identifier.

In some embodiments of method 500, the first set of parameters includes an entire information associated with or a part of the entire information associated with any one or more of: the group identifier, the category to which the communication device or the another communication device belongs, the power saving level, the power efficiency level, the RRC state, and the paging probability threshold value. In some embodiments of method 500, the first set of parameters or a first part of at least one parameter from the first set of parameters is included in a resource allocation information of the first signal, a sequence generation information of the first signal, a radio network temporary identifier (RNTI) of the first signal, or a scrambling identifier of the first signal. In some embodiments of method 500, the first set of parameters or a second part of the at least one parameter from first set of parameters is indicated by a codepoint or an information field of the first signal, and the second part of the first set of parameters is different than the first part of the first set of parameters. In some embodiments of method 500, the first set of parameters includes a least significant bit (LSB) of the device identifier, and the second set of parameters includes a most significant bit (MSB) of the device identifier. In some embodiments of method 500, the first signal includes a wake-up signal (WUS). In some embodiments of method 500, the second signal is received on a paging scheduling channel.

In some embodiments of method 500, the communication device receives the WUS that includes a part of the group identifier, the communication device receiving the second signal includes the communication node receiving a paging scheduling channel that includes a second part of the group identifier, and a complete information of the group identifier is included in the first part and the second part. In some embodiments of method 500, the communication device receives the WUS that includes a part of the device identifier, the communication device receiving the second signal includes the communication node receiving a paging scheduling channel that includes a second part of the device identifier, and a complete information of the device identifier is included in the first part and the second part. In some embodiments of method 500, the group identifier or the device identifier is indicated by the first signal or the second signal. In some embodiments of method 500, the group identifier is based on a part of information or an entire information associated with: the device identifier of the communication device, the 5G-S-TMSI, the category to which the communication device or the another communication device belongs, the RRC state, or the paging probability threshold value. In some embodiments of method 500, the paging scheduling channel includes a paging physical downlink control channel (PDCCH).

In some embodiments of method 500, one or more of most significant bits (MSBs) of the device identifier is included in the WUS. In some embodiments of method 500, one or more of least significant bits (LSBs) of the device identifier is included in the WUS. In some embodiments of method 500, one or more parameters to be included in the first set of parameters in the WUS is pre-determined. In some embodiments of method 500, one or more parameters to be included in the second set of parameters in the paging scheduling channel is pre-determined. In some embodiments of method 500, a system information block (SIB) received by the communication device indicates: (1) one or more parameters that are included in the first set of parameters in the WUS, or (2) one or more parameters that are included in the second set of parameters in the paging scheduling channel. In some embodiments of method 500, the performing the paging related operation includes: entering an active state from the low power RRC state; and monitoring, in the active state, a paging occasion to receive a paging message in the paging occasion. In some embodiments of method 500, the monitoring the paging occasion includes determining an absence of the paging message in the paging occasion.

In some embodiments of method 500, the performing the power saving related operation includes: determining not to monitor a paging occasion while remaining in the low power RRC state. In some embodiments of method 500, the first set of parameters include a subset of a plurality of parameters from the second set of parameters. In some embodiments of method 500, the low power RRC state includes an RRC idle state or an RRC inactive state.

Figure 6:
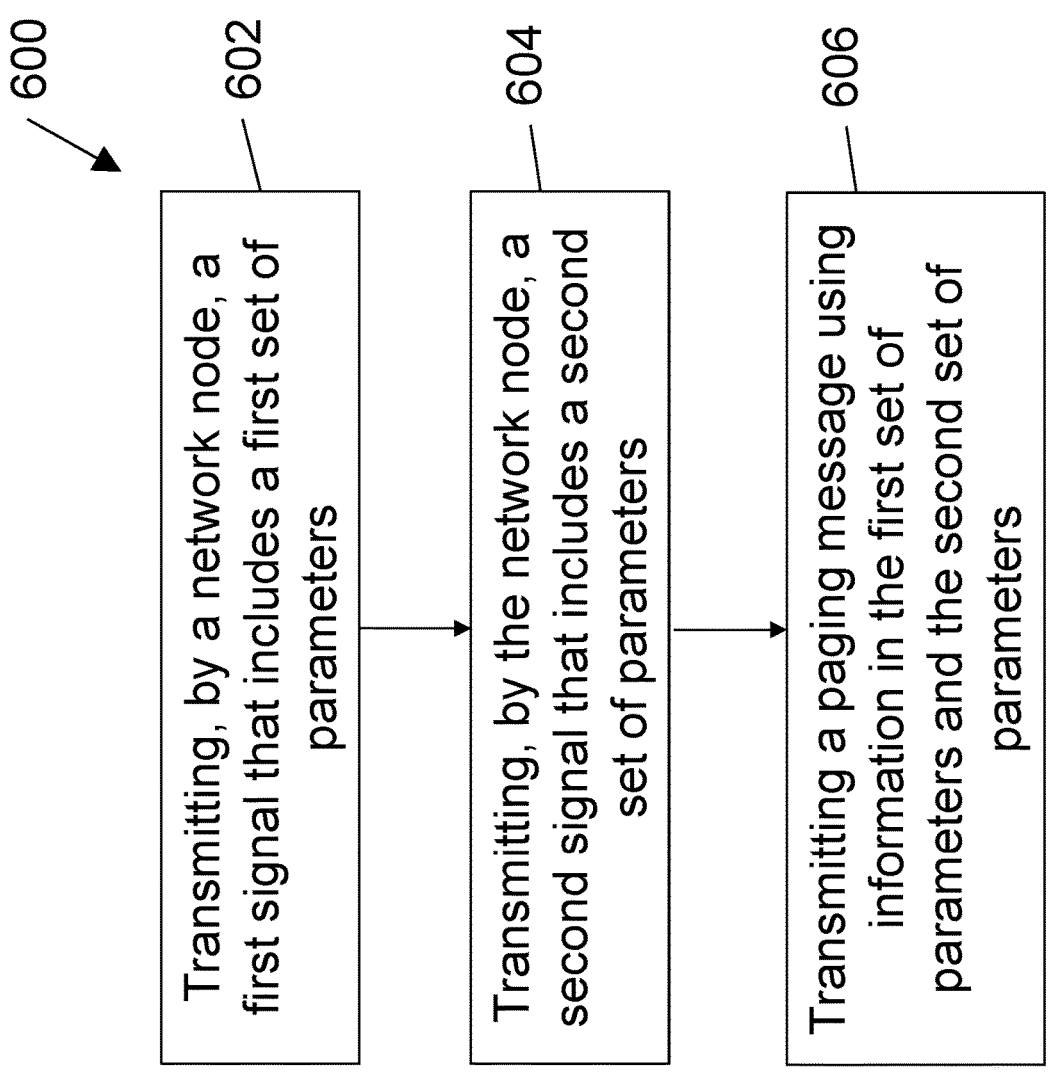

FIG. 6 shows a flowchart for an example method 600 of transmitting a paging message. Operation 602 includes transmitting, by a network node, a first signal that includes a first set of parameters. Operation 604 includes transmitting, by the network node, a second signal that includes a second set of parameters. Operation 606 includes transmitting a paging message using information in the first set of parameters and the second set of parameters.

In some embodiments of method 600, the first set of parameters or the second set of parameters includes any one or more of following listed parameters: a group identifier of a group to which a communication device belongs, a device identifier of the communication device, a 5G S-Temporary Mobile Subscriber Identifier (5G-S-TMSI) of the communication device, a category to which the communication device belongs, a power saving level, a power efficiency level, a radio resource control (RRC) state, a paging probability threshold value, a tracking reference signal (TRS) indication information, and a channel state information reference signal (CSI-RS) indication information. In some embodiments of method 600, the first set of parameters includes at least a first parameter that includes a subset of information of one parameter from the listed parameters, and the second set of parameters includes at least a second parameter that includes a remaining subset of information of the one parameter from the listed parameters, and a complete information of the one parameter comprises the subset of information and the remaining subset of information. In some embodiments of method 600, N parameters indicate a total number of the listed parameters, the first set of parameters includes N1 parameters from the listed parameters, the second set of parameters includes N2 parameters from the listed parameters, N, N1, and N2 are integers, N is greater than or equal to 2, and N is equal to N1+N2.

In some embodiments of method 600, the first set of parameters include a same set of parameters as the second set of parameters. In some embodiments of method 600, the first set of parameters are different from the second set of parameters. In some embodiments of method 600, the first set of parameters includes the group identifier and the second set of parameters include a device identifier. In some embodiments of method 600, the first set of parameters includes a least significant bit (LSB) of the device identifier, and the second set of parameters includes a most significant bit (MSB) of the device identifier. In some embodiments of method 600, the first signal includes a wake-up signal (WUS). In some embodiments of method 600, the second signal is received on a paging scheduling channel. In some embodiments of method 600, one or more parameters to be included in the first set of parameters in the WUS is pre-determined. In some embodiments of method 600, one or more parameters to be included in the second set of parameters in the paging scheduling channel is pre-determined. In some embodiments of method 600, a system information block (SIB) transmitted by the network node indicates: (1) one or more parameters that are included in the first set of parameters in the WUS, and (2) one or more parameters that are included in the second set of parameters in the paging scheduling channel.

Figure 7:
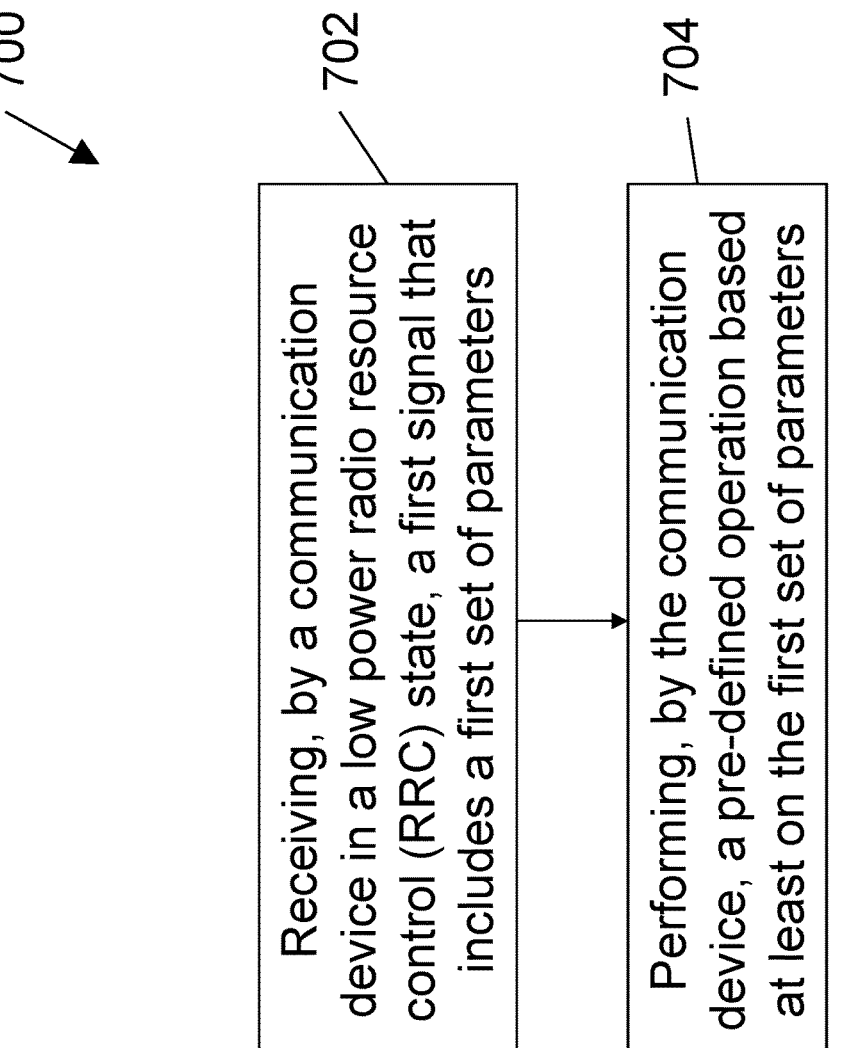

FIG. 7 shows a flowchart for an example method 700 for a communication device to perform a predefined operation. Operation 702 includes receiving, by a communication device in a low power radio resource control (RRC) state, a first signal that includes a first set of parameters. Operation 704 include performing, by the communication device, a pre-defined operation based at least on the first set of parameters.

In some embodiments of method 700, the performing the pre-defined operation includes: receiving, by the communication device in the low power RRC state, a second signal that includes a second set of parameters. In some embodiments of method 700, the performing the pre-defined operation includes: entering an active state from the low power RRC state; and monitoring, in the active state, a paging occasion to receive a paging message in the paging occasion. In some embodiments of method 700, the monitoring the paging occasion includes determining an absence of the paging message in the paging occasion. In some embodiments of method 700, the performing the pre-defined operation includes: determining not to monitor a paging occasion while remaining in the low power RRC state. In some embodiments of method 700, the first set of parameters or the second set of parameters includes any one or more of following listed parameters: a group identifier of a group to which the communication device or another communication device belongs, a device identifier of the communication device or the another communication device, a 5G S-Temporary Mobile Subscriber Identifier (5G-S-TMSI) of the communication device or the another communication device, a category to which the communication device or the another communication device belongs, a power saving level, a power efficiency level, a radio resource control (RRC) state, a paging probability threshold value, a tracking reference signal (TRS) indication information, and a channel state information reference signal (CSI-RS) indication information.

In some embodiments of method 700, the first set of parameters includes at least a first parameter that includes a subset of information of one parameter from the listed parameters, the second set of parameters includes at least a second parameter that includes a remaining subset of information of the one parameter from the listed parameters, and a complete information of the one parameter comprises the subset of information and the remaining subset of information. In some embodiments of method 700, the first set of parameters includes a least significant bit (LSB) of the device identifier. In some embodiments of method 700, one or more parameters to be included in the first set of parameters is pre-determined. In some embodiments of method 700, one or more parameters to be included in the second set of parameters is pre-determined. In some embodiments of method 700, the low power RRC state includes an RRC idle state or an RRC inactive state.

In some embodiments, an apparatus for wireless communication comprising a processor, configured to implement operations for method(s) 500-700 and/or operations for techniques described in this patent document. In some embodiments, a non-transitory computer readable program storage medium having code stored thereon, the code, when executed by a processor, causing the processor to implement operations for method(s) 500-700 and/or operations for techniques described in this patent document.

Figure 8:
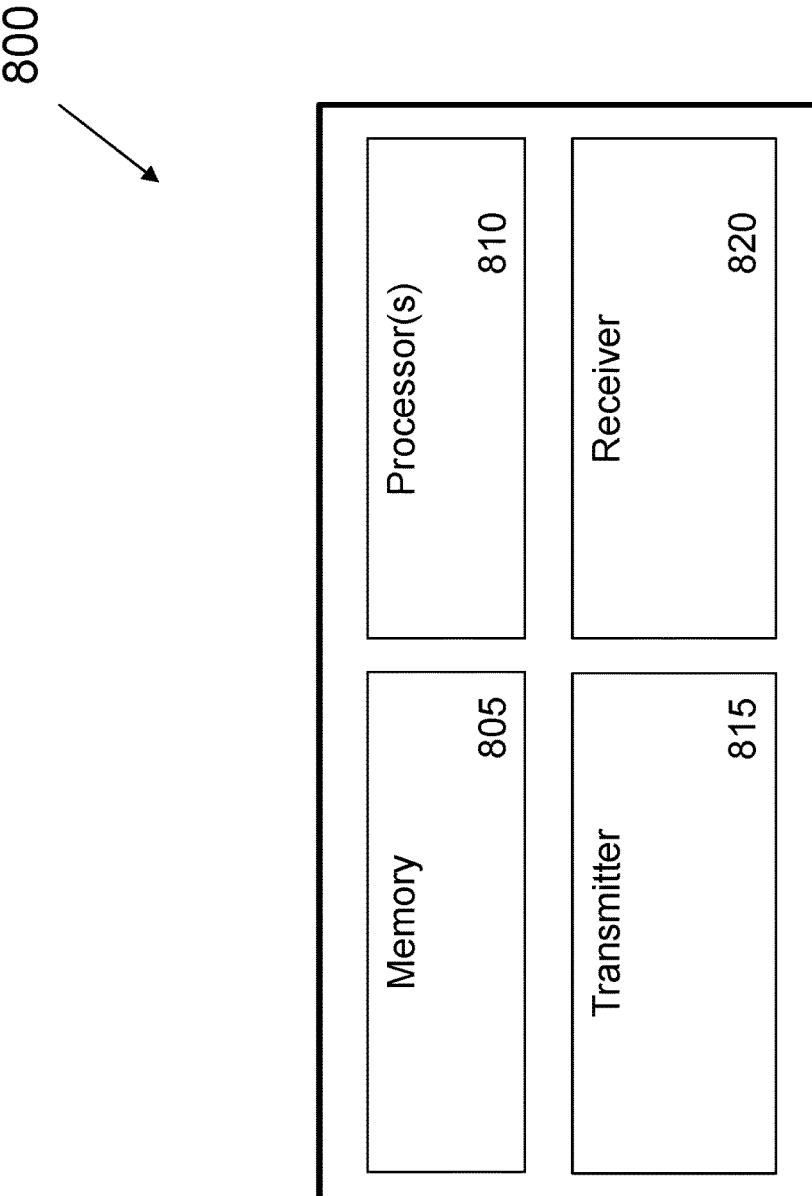
FIG. 8 shows an exemplary block diagram of a hardware platform that may be a part of a network node or a user equipment.

FIG. 8 shows an exemplary block diagram of a hardware platform 800 that may be a part of a network node (also known as base station) or a user equipment (also known as communication device). The hardware platform 800 includes at least one processor 810 and a memory 805 having instructions stored thereupon. The instructions upon execution by the processor 810 configure the hardware platform 800 to perform the operations described in FIGS. 1 to 7 and in the various embodiments described in this patent document. The transmitter 815 transmits or sends information or data to another node. For example, a network node transmitter can send a message to a user equipment. The receiver 820 receives information or data transmitted or sent by another node. For example, a user equipment can receive a message from a network node.

Figure 9:
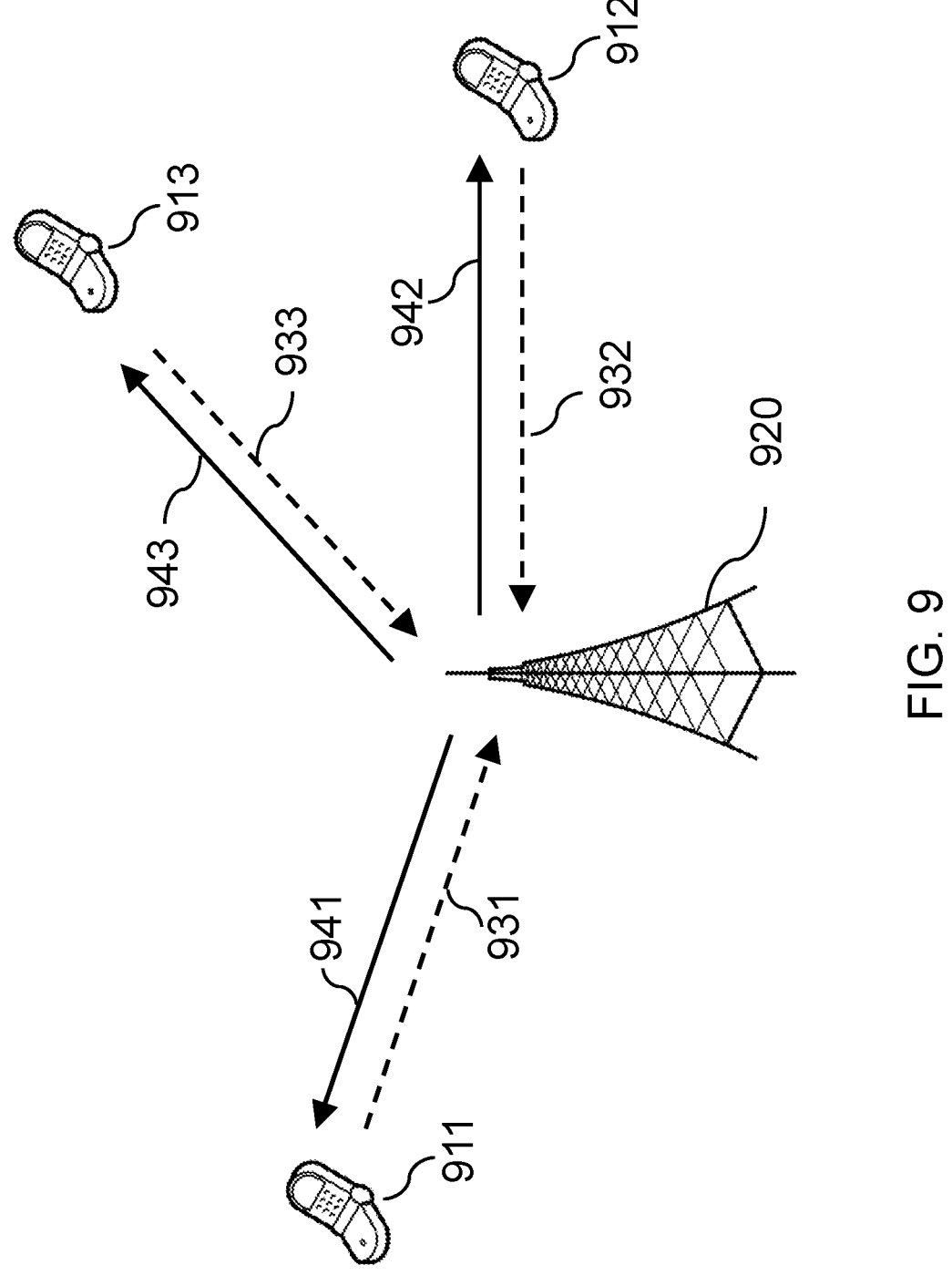
FIG. 9 shows an example of wireless communication including a base station (BS) and user equipment (UE) based on some implementations of the disclosed technology.

The implementations as discussed above will apply to a wireless communication. FIG. 9 shows an example of a wireless communication system (e.g., a 5G or NR cellular network) that includes a base station 920 and one or more user equipment (UE) 911, 912 and 913. In some embodiments, the UEs access the BS (e.g., the network) using a communication link to the network (sometimes called uplink direction, as depicted by dashed arrows 931, 932, 933), which then enables subsequent communication (e.g., shown in the direction from the network to the UEs, sometimes called downlink direction, shown by arrows 941, 942, 943) from the BS to the UEs. In some embodiments, the BS send information to the UEs (sometimes called downlink direction, as depicted by arrows 941, 942, 943), which then enables subsequent communication (e.g., shown in the direction from the UEs to the BS, sometimes called uplink direction, shown by dashed arrows 931, 932, 933) from the UEs to the BS. The UE may be, for example, a smartphone, a tablet, a mobile computer, a machine to machine (M2M) device, an Internet of Things (IoT) device, and so on.

The following section describes additional example technical items as described in this patent document:

Item 1: According to configuration, a UE under RRC_Idle/RRC_Inactive state can receive a first sub-set of paging indication information from a first kind of signal/channel; receive or not receive a second sub-set of paging indication information from a second kind of signal/channel according to the said first sub-set of paging indication; and perform a predefined operation according the said paging indication information.

Item 2: According to item 1, the said paging indication information includes both the said first parameter sub-set and the said second parameter sub-set, which includes or associates information of one or more of a whole or part(s) of UE group ID, UE ID, 5G-S-TMSI, UE category, UE's RRC state, paging probability threshold, tracking reference signal indication information, channel state information reference signal indication information. If the said paging indication information only include one parameter, the first parameter sub-set is a part of the parameter, the second parameter subset is the remain part of the parameter. If the said paging indication information only include N parameters, the first parameter sub-set include N1 parameters among them, the second parameter subset include the remain N2 parameters among them, N, N1, N2 are integers, N>=2, N1+N2=N.

Item 3: According to item 2, these sub-sets have the same or different information.

Item 4: According to item 1-3, the said first parameter sub-set includes UE group ID and the said second parameter sub-set includes UE ID.

Item 5: According to item 1-3, the first sub-set of paging information from a first kind of signal/channel includes or associates information of at least one of the: a whole or part(s) of UE group ID, UE category, UE's RRC state, or paging probability threshold.

Item 6: According to item 1-3, the first sub-set of paging information from a first kind of signal/channel associates information of at least one of the a whole or part(s) of UE group ID, UE category, UE's RRC state, or paging probability threshold, includes, at least one of the resource allocation, sequence generation, RNTI, scrambling ID of the first kind of signal/channel is associated with information of at least one of the a whole or part(s) of UE group ID, UE category, UE's RRC state, or paging probability threshold.

Item 7: According to item 1-3, the first sub-set of paging information from a first kind of signal/channel includes information of at least one of the: a whole or part(s) of UE group ID, UE category, UE's RRC state, or paging probability threshold, includes, at least one of the: a whole or part(s) of UE group ID, UE category, UE's RRC state, or paging probability threshold, includes indication by a code-point, information field of a first kind of signal/channel.

Item 8: According to item 3, if these parameter sub-sets have the same parameter, then different parts can be in these parameter sub-sets.

Item 9: According to item 1-5, the said first parameter sub-set includes LSB of UE ID and the said second parameter sub-set includes MSB of UE ID.

Item 10: According to item 1, the said first kind of signal/channel includes wake-up signal (WUS) for UE under RRC_Idle/RRC_Inactive state.

Item 11: According to item 1, the said second kind of signal/channel includes paging scheduling channel.

Item 12: According to item 1-11, a UE monitors WUS that carries part(s) of UE group ID and monitors paging scheduling channel that carries remaining part(s) of UE group ID.

Item 13: According to item 1-11, a UE monitors WUS that carries part(s) of UE ID and monitors paging scheduling channel that carries remaining part(s) of UE ID.

Item 14: According to item 12-13, the UE group ID and UE ID can be carried explicitly in signal/channel or implicitly in signal/channel.

Item 15: According to item 12-14, the UE group ID or UE ID is determined by at least one of a whole or part(s) of UE group ID, UE ID, 5G-S-TMSI, UE category, UE's RRC state, or paging probability threshold.

Item 16: According to item 5 and 13, one or more of the MSB of UE ID is/are carried on WUS.

Item 17: According to item 5 and 13, one or more of the LSB of UE ID is/are carried on WUS.

Item 18: According to item 1, the said configuration includes, which part(s) of paging indication is/are carried on WUS.

Item 19: According to item 1, the said configuration includes, which part(s) of paging indication is/are carried on paging scheduling channel.

Item 20: According to item 1-19, the said configuration of sub-set on WUS and/or paging scheduling channel is broadcasted on system information block (SIB).

Item 21: According to item 1, the said predefined operation includes, waking up to monitor incoming paging occasion/paging message.

Item 22: According to item 1, the said predefined operation includes, skipping the incoming paging occasion.

Item 23: According to item 1-13, a UE will monitor the first kind of signal/channel for a sub-set of paging indication information while the UE will monitor the second kind of signal/channel for total paging indication information.

Item 24: According to item 1-23, if this paging indication information from these two signals/channels were not consistent, then this UE can discard the paging indication information from the first kind of signal/channel (e.g., WUS) and execute a procedure according the paging indication information from the second kind of signal/channel (e.g., paging PDCCH).

Item 25: According to configuration, a base station can transmit a first sub-set of paging indication on a first kind of signal/channel; transmit a second sub-set of paging indication on a second kind of signal/channel; and transmit a paging message according to the said paging indication.

Item 26: According to item 25, the said paging indication information includes the said first parameter sub-set and the said second parameter sub-set. These parameter sub-sets include (or associate) a whole or part(s) of UE group ID, UE ID, 5G-S-TMSI, UE category, UE's RRC state, paging probability threshold.

Item 27: According to item 26, these parameter sub-sets can have the same or different parameter.

Item 28: According to item 25-27, the said first parameter sub-set includes UE group ID and the said second parameter sub-set includes UE ID.

Item 29: According to item 27, if these parameter sub-sets have the same parameter, then different parts can be in these parameter sub-sets.

Item 30: According to item 25-29, the said first parameter sub-set includes LSB of UE ID and the said second parameter sub-set includes MSB of UE ID.

Item 31: According to item 25, the said one kind of signal/channel includes wake-up signal (WUS) for UE under RRC_Idle/RRC_Inactive state.

Item 32: According to item 25, the said another kind of signal/channel includes paging scheduling channel.

Item 33: According to item 25, the said configuration includes, which part(s) of paging indication is/are carried on WUS.

Item 34: According to item 25, the said configuration includes, which part(s) of paging indication is/are carried on paging scheduling channel.

Item 35: According to item 25-34, the said configuration of sub-set on WUS and/or paging scheduling channel is broadcasted on system information block (SIB).

Item 36: According to configuration, a UE under RRC_Idle/RRC_Inactive state can receive a first sub-set of paging indication information from a first kind of signal/channel; and perform a predefined operation according the said paging indication information.

Item 37: According to item 36, the said predefined operation includes receive a second sub-set of paging indication information from a second kind of signal/channel.

Item 38: According to item 36, the said predefined operation includes, waking up to monitor incoming paging occasion/paging message.

Item 39: According to item 36, the said predefined operation includes, skipping the incoming paging occasion.

Item 40: According to item 36-37, the said paging indication information includes a sub-set of UE group ID, UE ID, 5G-S-TMSI, UE category, UE's RRC state, paging probability threshold, tracking reference signal indication information, channel state information reference signal indication information.

Item 41: According to item 40, the said sub-set includes least significant bit (LSB) of UE ID.

Item 42: According to item 36, the said configuration includes, which sub-set(s) of paging indication is/are carried on the said first kind of signal/channel.

Item 43: According to item 36-37, the said configuration includes, which sub-set(s) of paging indication is/are carried on the said second kind of signal/channel.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a communication device in an radio resource control (RRC) idle state or an RRC inactive state, a first signal that includes a first set of parameters comprising a first part of a group identifier of a group to which the communication device or another communication device belongs or a first part of a device identifier of the communication device or the another communication device, wherein the first set of parameters includes at least a first parameter that includes a subset of information of one parameter;

receiving, by the communication device in the RRC idle state or the RRC inactive state before performing a paging related operation or a power saving related operation, a second signal that includes a second set of parameters comprising a second part of the group identifier or a second part of the device identifier, wherein the second set of parameters includes at least a second parameter that includes a remaining subset of information of the one parameter, a complete information of the one parameter comprising the subset of information and the remaining subset of information, wherein the first set of parameters or the second set of parameters includes at least one of: a paging probability threshold value, a power saving level, a power efficiency level, a tracking reference signal (TRS) indication information, or a channel state information reference signal (CSI-RS) indication information; and performing, by the communication device, the paging related operation or the power saving related operation based on (i) the first part and the second part of the group identifier or (ii) the first part and the second part of the device identifier.

2. The wireless communication method of claim 1, wherein the first set of parameters or the second set of parameters further includes at least one of following listed parameters:

a 5G S-Temporary Mobile Subscriber Identifier (5G-S-TMSI) of the communication device or the another communication device, a category to which the communication device or the another communication device belongs, or a RRC state.

3. The wireless communication method of claim 2,
wherein N parameters indicate a total number of the listed
parameters,
wherein the first set of parameters includes N1 parameters
from the listed parameters,
wherein the second set of parameters includes N2 parameters from the listed parameters,
wherein N, N1, and N2 are integers,
wherein N is greater than or equal to 2, and
wherein N is equal to N1+N2.

4. The wireless communication method of claim 2,
wherein the first set of parameters includes a least significant
bit (LSB) of the device identifier, and the second set of
parameters includes a most significant bit (MSB) of the
device identifier.

5. The wireless communication method of claim 4,
wherein the first signal includes a wake-up signal (WUS).

6. The wireless communication method of claim 5,
wherein the communication device receives the WUS that
includes the first part of the group identifier, and
wherein the communication device receiving the second
signal includes a communication node receiving a
paging scheduling channel that includes the second part
of the group identifier, and
wherein a complete information of the group identifier is
included in the first part and the second part.

7. The wireless communication method of claim 5,
wherein the communication device receives the WUS that
includes the first part of the device identifier, and
wherein the communication device receiving the second
signal includes a communication node receiving a
paging scheduling channel that includes the second part
of the device identifier, and
wherein a complete information of the device identifier is
included in the first part and the second part.

8. The wireless communication method of claim 7,
wherein the group identifier or the device identifier is
indicated by the first signal or the second signal.

9. The wireless communication method of claim 1,
wherein the first set of parameters include a same set of
parameters as the second set of parameters.

10. The wireless communication method of claim 1,
wherein the first set of parameters are different from the
second set of parameters.

11. The wireless communication method of claim 1,
wherein the first set of parameters or a first part of at least
one parameter from the first set of parameters is included in
a resource allocation information of the first signal, a
sequence generation information of the first signal, a radio
network temporary identifier (RNTI) of the first signal, or a
scrambling identifier of the first signal.

12. The wireless communication method of claim 1,
wherein the first set of parameters or a second part of at least
one parameter from the first set of parameters is indicated by
a codepoint or an information field of the first signal, and
wherein the second part of the first set of parameters is
different than the first part of the first set of parameters.

13. The wireless communication method of claim 1,
wherein the second signal is received on a paging scheduling
channel.

14. A communication device, comprising:
at least one processor configured to:
receive, via a receiver in an radio resource control
(RRC) idle state or an RRC inactive state, a first
signal that includes a first set of parameters comprising a first part of a group identifier of a group to
which the communication device or another communication device belongs or a first part of a device
identifier of the communication device or the another
communication device, wherein the first set of
parameters includes at least a first parameter that
includes a subset of information of one parameter;
receive, by the receiver in the RRC idle state or the
RRC inactive state before performing a paging
related operation or a power saving related operation, a second signal that includes a second set of
parameters comprising a second part of the group
identifier or a second part of the device identifier,
wherein the second set of parameters includes at
least a second parameter that includes a remaining
subset of information of the one parameter, a complete information of the one parameter comprising
the subset of information and the remaining subset of
information, wherein the first set of parameters or the
second set of parameters includes at least one of: a
paging probability threshold value, a power saving
level, a power efficiency level, a tracking reference
signal (TRS) indication information, or a channel
state information reference signal (CSI-RS) indication information; and
perform the paging related operation or the power
saving related operation based on (i) the first part and
the second part of the group identifier or (ii) the first
part and the second part of the device identifier.

15. A wireless communication method, comprising:
transmitting, by a network node, a first signal that
includes a first set of parameters comprising a first part
of a group identifier of a group to which a communication device or another communication device
belongs or a first part of a device identifier of the
communication device or the another communication
device, wherein the first set of parameters includes at
least a first parameter that includes a subset of information of one parameter;
transmitting, by the network node, a second signal that
includes a second set of parameters comprising a
second part of the group identifier or a second part of
the device identifier, wherein the second set of parameters includes at least a second parameter that includes
a remaining subset of information of the one parameter,
a complete information of the one parameter comprising the subset of information and the remaining subset
of information, wherein the first set of parameters or the
second set of parameters includes at least one of: a
paging probability threshold value, a power saving
level, a power efficiency level, a tracking reference
signal (TRS) indication information, or a channel state
information reference signal (CSI-RS) indication information; and
transmitting a paging message using information in (i) the
first part and the second part of the group identifier or
(ii) the first part and the second part of the device
identifier.

16. A network node, comprising:
at least one processor configured to:
transmit, via a transmitter, a first signal that includes a
first set of parameters comprising a first part of a
group identifier of a group to which a communication device or another communication device
belongs or a first part of a device identifier of the
communication device or the another communication device, wherein the first set of parameters
includes at least a first parameter that includes a
subset of information of one parameter;

transmit, via the transmitter, a second signal that includes a second set of parameters comprising a second part of the group identifier or a second part of the device identifier, wherein the second set of parameters includes at least a second parameter that includes a remaining subset of information of the one parameter, a complete information of the one parameter comprising the subset of information and the remaining subset of information, wherein the first set of parameters or the second set of parameters includes at least one of: a paging probability threshold value, a power saving level, a power efficiency level, a tracking reference signal (TRS) indication information, or a channel state information reference signal (CSI-RS) indication information; and transmit, via the transmitter, a paging message using information in (i) the first part and the second part of the group identifier or (ii) the first part and the second part of the device identifier.

* * * * *